US008472583B2

(12) United States Patent
Star-Lack et al.

(10) Patent No.: US 8,472,583 B2
(45) Date of Patent: Jun. 25, 2013

(54) RADIATION SCANNING OF OBJECTS FOR CONTRABAND

(75) Inventors: Josh Star-Lack, Palo Alto, CA (US); Michael C. Green, Palo Alto, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 318 days.

(21) Appl. No.: 12/924,533

(22) Filed: Sep. 29, 2010

(65) Prior Publication Data
US 2012/0076257 A1 Mar. 29, 2012

(51) Int. Cl.
*G01N 23/04* (2006.01)
(52) U.S. Cl.
USPC .................................. 378/57; 378/4
(58) Field of Classification Search
USPC .................. 378/4, 19, 57, 196, 197
See application file for complete search history.

(56) References Cited

U.S. PATENT DOCUMENTS

| | | | |
|---|---|---|---|
| 2,659,827 A | 11/1953 | Scag et al. | |
| 4,137,455 A | 1/1979 | Fetter | |
| 4,382,208 A | 5/1983 | Meddaugh et al. | |
| 4,400,650 A | 8/1983 | Giebeler, Jr. | |
| 4,669,103 A | 5/1987 | Barnea | |
| 4,894,855 A * | 1/1990 | Kresse | 378/196 |
| 5,567,552 A | 10/1996 | Ham | |
| 5,638,420 A | 6/1997 | Armistead | |
| 6,078,642 A | 6/2000 | Simanovsky et al. | |
| 6,200,024 B1 * | 3/2001 | Negrelli | 378/197 |
| 6,366,021 B1 | 4/2002 | Meddaugh et al. | |
| 6,486,808 B1 | 11/2002 | Seppi et al. | |
| 7,103,137 B2 | 9/2006 | Seppi et al. | |
| 7,208,810 B2 | 4/2007 | Wright | |
| 7,257,108 B2 | 8/2007 | Cheston et al. | |
| 7,397,891 B2 | 7/2008 | Johnson et al. | |
| 7,627,083 B2 * | 12/2009 | Ross et al. | 378/58 |
| 8,183,801 B2 | 5/2012 | Chen et al. | |
| 8,198,587 B2 | 6/2012 | Whittum et al. | |
| 2003/0161434 A1 * | 8/2003 | Rand et al. | 378/4 |
| 2006/0126772 A1 | 6/2006 | Hu et al. | |
| 2008/0058906 A1 | 3/2008 | Spangler et al. | |
| 2011/0085636 A1 * | 4/2011 | Dennerlein | 378/4 |
| 2012/0148019 A1 * | 6/2012 | Johnson et al. | 378/57 |

OTHER PUBLICATIONS

Buetzow, "Automated Radiography of Space Shuttle Motor", Materials Evaluation, vol. 47, No. 6, pp. 686-691; The American Society for Nondestructive Testing, Inc. 1989.

(Continued)

*Primary Examiner* — Irakli Kiknadze
(74) *Attorney, Agent, or Firm* — Brandon N. Sklar; Cozen O'Connor

(57) ABSTRACT

In one example, a scanning system for examining contents of an object is disclosed comprising a frame encompassing, at least in part, a first interior region, a robotic arm movably supported by the frame, and a radiation source to generate a radiation beam to examine an object, the radiation source being pivotally coupled to the robotic arm. A detector is positioned and configured to encompass, at least in part, a second interior region within the first interior region, to detect radiation after interaction with the object. A conveying system moves the object, at least in part, through the second interior region. The frame and the robotic arm are configured to move the radiation source at least partially around the object to be examined and the robotic arm is configured to pivot the radiation source to aim the source toward the object.

25 Claims, 12 Drawing Sheets

OTHER PUBLICATIONS

"Wazee Crane—The Rocky Mountain Region's Premier Crane Builder" (2009), available at http://www.wazeecrane.com/cranes.html (10 pages).

Seeram, "Computed Tomography: Physical Principals, Clinical Applications, and Quality Control", Second Edition, W.B. Saunders Company, (2001), pp. 10, 77-81.

* cited by examiner

RADIATION SCANNING OF OBJECTS FOR CONTRABAND

FIELD OF THE INVENTION

Radiation scanning of objects, including large objects such as cargo containers, to identify contraband.

BACKGROUND OF THE INVENTION

Radiation is commonly used in the non-invasive inspection of objects such as luggage, bags, briefcases and the like, to identify hidden contraband at airports and public buildings. The contraband may include hidden guns, knives, explosive devices and illegal drugs, for example. One common inspection system is a line scanner, where the object to be inspected is passed between a stationary source of radiation, such as X-ray radiation, and a stationary detector. The radiation is collimated into a fan beam or a pencil beam. Radiation transmitted through the object is attenuated to varying degrees by the contents of the luggage. The attenuation of the radiation is a function of the density of the materials through which the radiation beam passes. The attenuated radiation is detected and radiographic images of the contents of the object are generated for inspection. The images show the shape, size and varying densities of the contents.

One disadvantage of radiographic imaging is that all items within the object in the path of the radiation beam are superimposed on the image. If there are many items in the object, it may be difficult to distinguish among them. In addition, the ability to identify a suspect item within an object may be dependent upon the item's shape and orientation within the object. in sheets of explosive materials may also be difficult to identify on a radiograph, particularly if they are oriented perpendicular to the scanning beam.

Computed tomography ("CT") enables the reconstruction of the cross-sectional images of luggage contents, facilitating the identification of the items in the luggage. Since images are acquired at multiple angles, item shape and orientation are of less concern. CT images also provide higher resolution, greater image contrast and greater sensitivity to characteristics of the object being scanned, than radiographs. However, reconstruction of CT images of an object requires a large number of scans of the object at a plurality of angles. Conducting a sufficient number of scans for CT reconstruction is time consuming. Depending on the system used, CT imaging of an entire piece of luggage may be too slow for practical use in screening luggage in airports, for example.

Third generation CT configurations, where an X-ray source and a detector are mounted on opposite sides of a rotating gantry, have been used to scan luggage. The luggage is moved through the gantry and the X-ray source and the detector are rotated around the luggage. Examples of third generation CT systems for examining luggage are described in U.S. Pat. No. 5,567,552 and U.S. Pat. No. 6,078,642, for example.

The inspection of cargo containers at national borders, seaports, and airports is a critical problem in national security. Due to the high rate of arrival of such containers, 100% inspection requires rapid imaging of each container. Standard cargo containers are typically 20-50 feet long (6.1-15.2 meters), 8 feet high (2.4 meters), and 6-9 feet wide (1.8-2.7 meters). Larger air cargo containers, which are used to contain a plurality of pieces of luggage or other cargo to be stored in the body of an airplane, may be up to about 240×118×96 inches (6.1×3.0×2.4 meters). MeV radiation sources are typically required to generate radiation with sufficient energy to penetrate through standard cargo containers and the larger air cargo containers. Large collections of objects, such as many pieces of luggage, may also be supported on a pallet. Pallets, which may have supporting side walls, may be of comparable sizes as cargo containers and use of the term cargo container will generally encompass pallets, as well.

A third generation CT system said to be large enough to scan cargo containers is described in U.S. Patent Publication No. 2006/0126772. However, it is believed that such a large third generation CT system would be too expensive to be commercially viable.

In U.S. Pat. No. 5,638,420, large containers are inspected by a system on a movable frame. A source of a fan beam, a cone beam or a pencil beam of X-ray radiation, such as a linear accelerator with an accelerating potential in the MeV range, is mounted on one side of the frame. A detector array is mounted on an opposing side of the frame. The frame, which may be self-propelled, advances across the length of the container during scanning. Radiographic images are generated for analysis by an operator.

In medical CT scanning, there is a configuration referred to as fourth generation, wherein a source of X-ray radiation rotates completely around a patient in a path of a circle within a larger, stationary circular detector array. Fourth generation CT scanners have been found to be an improvement over earlier generations of scanners where both the source and the detector arrays are moved. Scanning times are shorter and the construction of the scanner is simpler. The arrangements of sources and detectors in medical CT scanners are described in more detail in Seeram, Euclid, *Computed Tomography: Physical Principles, Clinical Applications, and Quality Control*, Second Edition, W.B. Saunders Company, (2001), pp. 10, 77-81, for example. While only the source is moved completely around the patient, enlargement of such a system to accommodate large objects such as cargo containers would still be difficult and expensive.

U.S. Pat. No. 7,103,137, which is assigned to the assignee of the present invention and is incorporated by reference herein, describes a fourth generation type CT system in which one or more sources are moved across an arcuate rail above a cargo container and a plurality of stationary detector modules are arranged in an arc partially below the object. Scanning may be conducted over 180° plus the fan angle, enabling collection of a complete data set for reconstruction.

SUMMARY OF THE INVENTION

In accordance with an embodiment of the invention, a scanning system for examining contents of an object is disclosed comprising a frame encompassing, at least in part, a first interior region, a robotic arm movably supported by the frame, and a radiation source to generate a radiation beam to examine an object, the radiation source being pivotally coupled to the robotic arm. A detector is positioned and configured to encompass, at least in part, a second interior region within the first interior region, to detect radiation after interaction with the object. A conveying system moves the object, at least in part, through the second interior region. The frame and the robotic arm are configured to move the radiation source at least partially around the object to be examined and the robotic arm is configured to pivot the radiation source to aim the source toward the object. The robotic arm may be configured to move the radiation source only partially around an object to be examined. The object may comprise a cargo container. The frame and the robotic arm may be configured to move the radiation source in a region between the frame and the detector array. The conveying system may be configured to move the object through the second interior region in a first direction and the frame may be configured to move the robotic arm in a second direction transverse to the first direction.

The detector may comprise a detector array comprising a plurality of modules and the system may further comprise a second frame supporting the detector array. At least one detector module may be movably supported by the second frame for movement between a first position and a second position with respect to the second frame. In one example, in the first position, a respective one of the at least one detector modules is between the radiation source and the object, and in the second position, the respective detector module may not between the radiation source and the object, such that at least a portion of the detector module is outside of the path of the radiation beam emitted by the radiation source, during scanning. In another example, in the first position, a respective one of the detector modules is not in a position to detect radiation transmitted through the object, and in the second position, the respective detector module is in position to detect radiation transmitted through the object.

The radiation source may be movable within the second interior region, around the object. The radiation source may be a source of X-ray radiation. A processor may be configured to control operation of the robotic arm and to reconstruct computed tomography images based, at least in part, on data received from the detector. The robotic arm may be configured to pivot the radiation source about a horizontal axis and/or a vertical axis.

The detector may be aligned with a first plane and the robotic arm may be offset from the first plane so that the radiation source is movable by the robotic arm in a second plane different from the first plane so that the robotic arm is sufficiently offset from the first plane so that at least part of the radiation beam emitted by the radiation source illuminates the object without being intercepted by a portion of the detector. The detector array may be helical.

In accordance with another embodiment of the invention, a scanning system is disclosed for examining contents of an object comprising a frame encompassing, at least in part, a first interior region, a robotic arm supported by the frame within the first interior region, and a radiation source to generate a radiation beam to examine an object. The radiation source is pivotally coupled to the robotic arm. A detector array is within the first interior region and encompasses, at least in part, a second interior region, to detect radiation after interaction with the object. Means are also provided for moving the object through the second interior region, in a first direction. Means are also provided for moving the robotic arm in a second direction transverse to the first direction, partially around the object, to move the radiation source partially around the object. Means are also provided for moving a portion of the detector array between first and second positions as the radiation source is moved partially around the object.

In accordance with another embodiment of the invention, a method of examining contents of an object is disclosed comprising moving a radiation source partially around the object, by a robotic arm, generating a radiation beam to scan at least a portion of the object with a radiation beam at a plurality of angles, and pivoting the radiation source as the radiation source is moved around the object, by the robotic arm. The method further comprises detecting radiation transmitted through the object and processing data based on the detected radiation to form an image of at least the portion of the object. The data may be processed to form at least one computed tomographic image. The radiation may be detected by a detector array and a portion of the detector array may be moved between a first position between the object and the radiation source and a second position not between the object and the radiation source. A portion of the detector array may be moved into a position to detect the radiation, based, at least in part, on a position of the radiation source.

The detector array may be aligned with a first plane and the method may further comprise moving the radiation source through a plane offset from the central plane. The method may also comprise detecting the radiation by a helical detector. The radiation source may be moved diagonally with respect to the object. The object may comprise a cargo container, which may be moved in a first direction, through a region defined, at least in part, by a detector array, and the radiation source may be moved around the cargo container by the robotic arm in a second direction transverse to the first direction.

As used herein, the term "cargo container" encompasses pallets.

DESCRIPTION OF THE PREFERRED EMBODIMENTS

Figure 1:
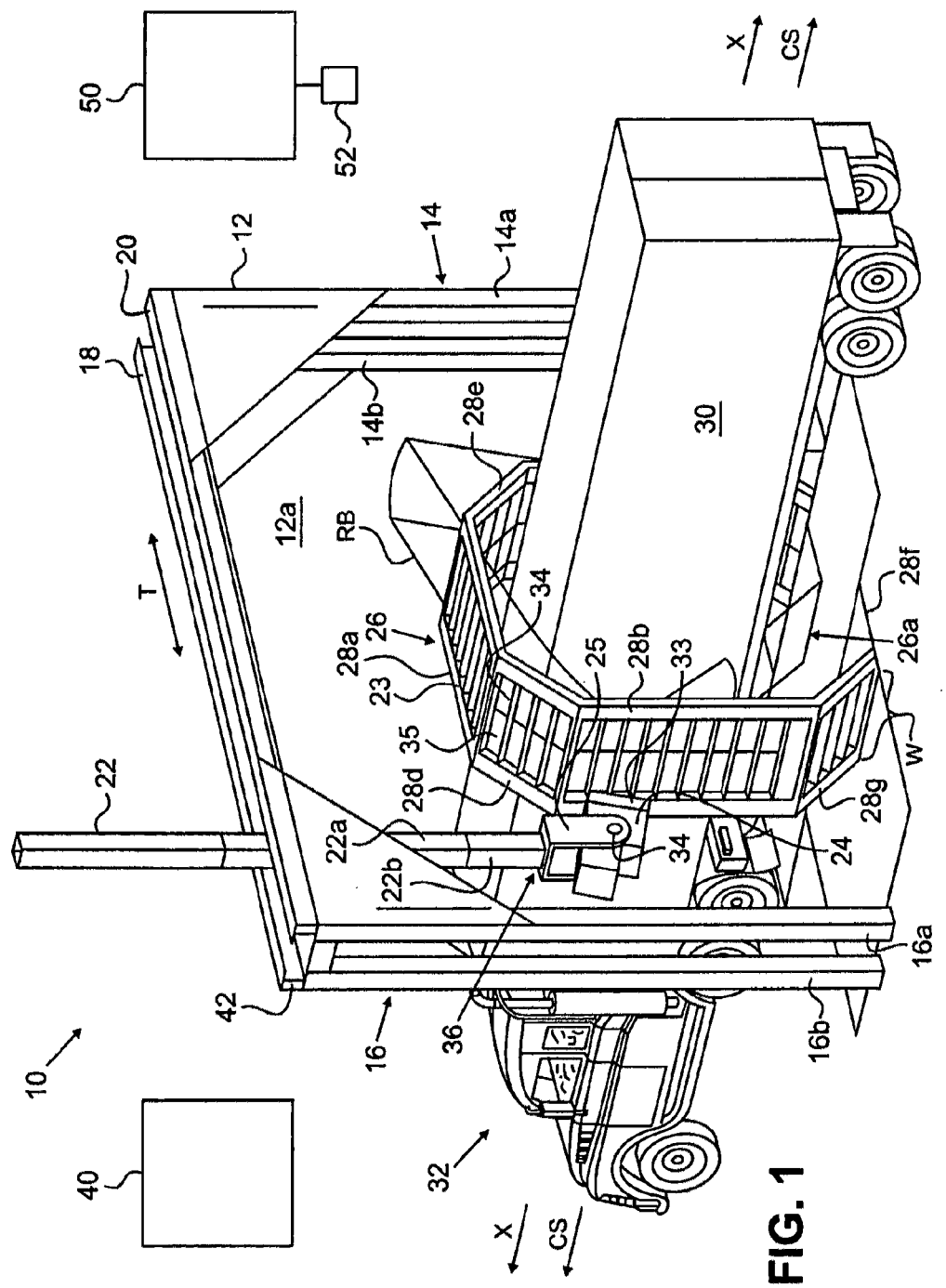
FIG. 1 is a perspective view of an example of a cargo scanning unit in accordance with one embodiment of the invention.

FIG. 1 is a perspective view of an example of a cargo scanning unit 10 for inspecting cargo containers for contraband, such as nuclear materials, conventional explosives, and illegal drugs, for example, in accordance with one embodiment of the invention. In this example, the scanning unit 10 comprises a first frame 12 having opposing vertical sides 14, 16 connected by a pair of horizontal rails 18, 20. The vertical sides 14, 16 rest on or are mounted to the ground, a floor, or additional portions of the frame to encompass, at least in part, an interior region 12a. Each vertical side 14, 16 may comprise adjacent vertical posts 14a, 14b, and 16a, 16b, respectively, for example. Other configurations may be provided. A robotic arm 22 is movable across and extends downwardly from the horizontal rails 18, 20. A radiation source 24 is pivotally coupled to a head end 25 of the robotic arm 22. A second frame 23 within the region 12a encompassed by the first frame 12 supports a detector array 26 comprising a plurality of detector panels 28. The second frame 26 may rest on or be mounted to the ground, a floor, or additional portions of the first frame 12 to encompass, at least in part, an interior region 26a through which a cargo container 30 passes during scanning. The cargo container 30 may be supported by a truck 32, which is moved through the region 26a by a conveyor system represented schematically by arrows CS.

The cargo container 30 is scanned by a radiation beam RB generated by the radiation source 24 as the source is moved around the cargo container by the robotic arm 22. The truck 32 may also be scanned. The detector array 26 detects radiation transmitted through the cargo container 30. The conveyor system CS moves the cargo container 30 through the region 26a in a first direction, along the axial direction X of the scanning unit 10, during scanning. Reference to the "axial direction X" herein means the direction of the axes aligned with or parallel to the axis of rotation of the X-ray source 24 as it is moved around the cargo container 30.

The robotic arm 22 may be a telescoping arm comprising a first, upper portion 22a, and a second, lower portion 22b receiving the first, upper portion, or vice-a-versa, for example. Robotic arms, such as the robotic arm 22, are known in the art. The upper and lower portions 22a, 22b may be moved with respect to each other by any one of several mechanisms known in the art, such as pneumatic mechanisms, and/or mechanical mechanisms, such as motor driven gears, cables, and/or pulleys, for example.

In this example, the robotic arm 22 and radiation source 24 are moved through a plane perpendicular to the axial direction X, and aligned with a central plane CP through a center of the panels 28 of the detector array 26. (See FIGS. 5a, 5b, and 8, for example). The central plane CP in this example is aligned with a central axis CB through the center of the each detector panel, bisecting the detector panels.

The head end 25 pivots the radiation source 24 so that a central axis CA, about which the radiation beam RB is centered, intersects a predetermined isocenter C as the radiation source 24 is moved around the cargo container 30, as shown in FIGS. 2, 3a, 3b, and 3c. The isocenter C may be the center of the cargo container 30, the center of the region 26a, which may be the same as the center of the cargo container, or another location. The isocenter C may be aligned with the axis of rotation of the radiation source 24 around the cargo container 30, although that is not required.

The head end 25 may pivot the radiation source 24 about a horizontal pivot 34, which rotates about a horizontal axis, to aim the radiation beam RB at the desired location. The head end 25 may also be rotatable with respect to the robotic arm 22 about an axis 36, for example. Pivoting of the radiation source 24 by the head end 25 about the horizontal pivot 34 and rotation of the head end about the vertical axis 36 may be provided by any one of several mechanisms known in the art, such as pneumatic mechanisms, and/or mechanical mechanisms, such as motor driven gears and/or pulleys, for example.

A collimator 33 is attached to the radiation source 24 to appropriately shape the radiation beam RB, as is known in the art. The collimator 33 may comprise four (4) independently controlled collimator blades (not shown) that can define a cone beam, a fan beam, a pencil beam, or other shaped radiation beam. Other types of collimators may be used as well.

Movement of the robotic arm 22 may be controlled by a processor 40, such as programmable logic circuits, microprocessors, or a computer, such as the computer 50, which is discussed further, below. The radiation source 24, the collimator 33, and other system components may be controlled by the processor 40 or the computer 50, as well. Multiple processors of the same or different types, may be provided. The control system may be implemented in software, hardware, such as an application specific integrated circuit, or a combination of software and hardware. The movement of the arm 22 around the cargo container 30 and the pivoting of the source 24 may be programmed for automatic operation for cargo containers/trucks of known sizes. The program may define the path of the robotic arm 22 around the cargo container 30 and the pivot angle of the radiation source 24 at a plurality of positions of the robotic arm. Sensors (not shown) may be provided on the robotic arm 22 and the radiation source 24 to provide feedback to the processor 40 concerning the position and pivot angle of the radiation source 24, if desired. Sensors (not shown) may also be provided in association with the conveyor system CS and/or along the path of the cargo container 30 through the region 26a, to provide feedback to the processor 50 concerning the position of the cargo container. Movement of the arm 22 and pivoting of the radiation source 24 may be manually controlled by an operator, or the operator may intervene during programmed operation to manually control the scanning, as well.

Suitable frames 12 and robotic arms 22, which are variously referred to in the art as cartesian, linear, gantry, or rectilinear robots, or traveling cranes, for example, are commercially available from many sources, such as PaR Systems, Inc., Shoreview, Minn., for example. The PaR Systems XR® and MR® gantry robots may be used, for example. An example of a traveling crane supporting a betatron may be found in U.S. Pat. No. 2,659,827, which uses a motor driven cable system to control a robotic arm, and is incorporated by reference herein.

The panels 28 of the detector array 26 each comprise a plurality of modules 34 of detector elements. In this example, panels 28 extend completely around the region 27. A top rectilinear panel 28a extends horizontally, above the region 26a, two opposing vertical rectilinear sections 28b, 28c (not shown in this view), define the sides of the region, two upper inwardly angled rectilinear panels 28d, 28e connect the horizontal rectilinear panels to the vertical rectilinear panels, a bottom rectilinear panel 28f, and two lower inwardly angled rectilinear panels 28g, 28h, (not shown in this view), connect the bottom vertical rectilinear panels to the bottom rectilinear panel, defining the region 26a. The bottom rectilinear panel 28f may be positioned in a recess in or below a floor of the scanning unit 10, for example.

Other configurations for the detector array 26 may be provided. For example, the upper and lower inwardly angled connection panels 28d, 28e and 28f, 28g, respectively, which position the detector elements closer to the cargo container, and also allow the radiation source 24 to be moved closer to the cargo container, are optional. Either the top rectilinear section 26a or the bottom rectilinear section may also be excluded, depending on the configuration, the path of the radiation source 24 around the cargo container, and the amount of data that needs to be collected, as shown in FIGS. 2, and 3a-3c, for example, which are discussed below. If the upper and lower inwardly angled rectilinear sections 26d, 26e, 26g, 26h are not provided, the opposing vertical rectilinear sections 26b, 26e, and the top and/or bottom rectilinear sections 26a, 26f may be extended to meet at right angles.

Figure 2:
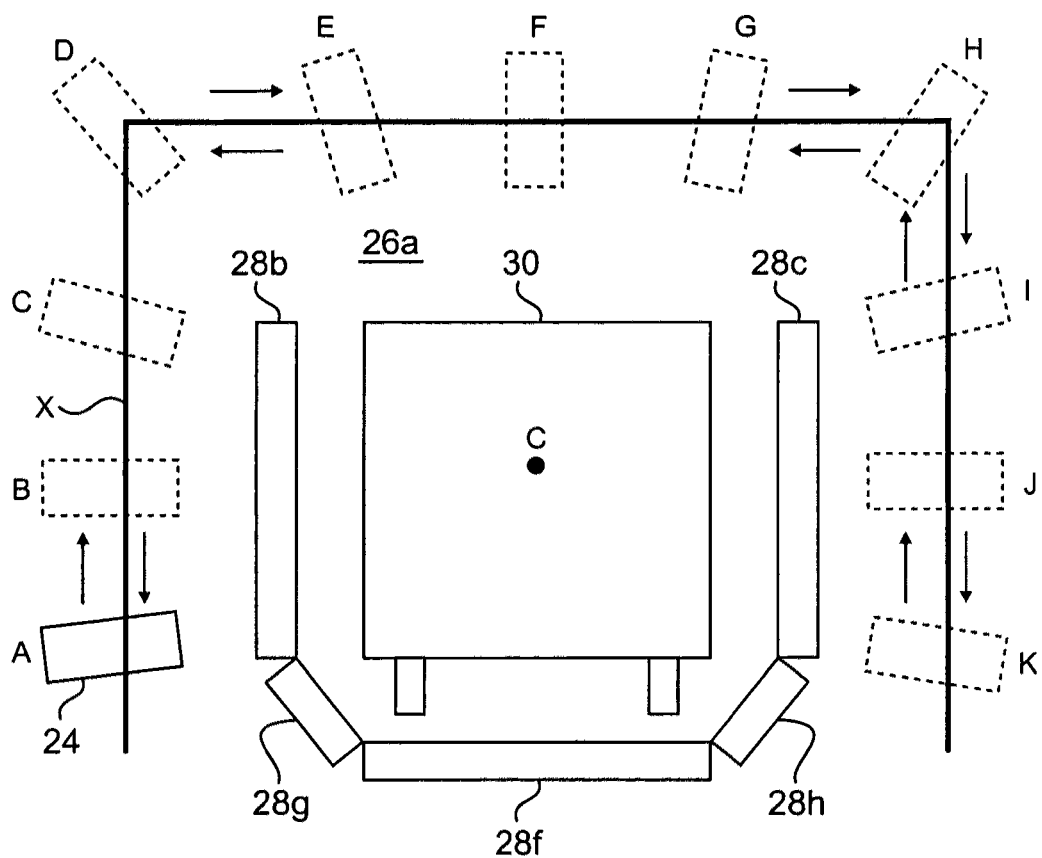
FIG. 2 is a schematic representation of a rear view of the scanning unit of FIG. 9.

FIG. 2 is a schematic representation of a rear view of the scanning unit 10, where the detector array 26 is U-shaped, with an open top, and does not include the top rectilinear panel 28a or the upper inwardly angled connection panels 26d, 26e of FIG. 1. The lower, inwardly angled rectilinear panel 26h and the side rectilinear panel 26c, which were obstructed from view by the cargo container in FIG. 1a, are shown. The radiation source 24 follows a rectangular path X around the cargo container 30 and is pivoted toward the center C of the region 26a. The radiation source 24 is shown in one position A. Subsequent positions B-K of the radiation source are shown in phantom. The radiation source 24 is moved along the path X, in a clockwise direction, moving through the positions A-K. If desired, the radiation source 24 may be moved in a counterclockwise direction back to A. The pivoting of the radiation source 24 at the positions A-K is also shown. The positions A-K are merely exemplary.

If the radiation beam RB emitted by the radiation source 24 is a cone beam, a volume of data is collected as the radiation source is moved clockwise from position A to position K. Another volume is collected as the radiation source is moved counterclockwise from position K to position A. If the cargo container 30 is not moved between the clockwise and counterclockwise movement, the volumes may be the same. If the radiation beam RB is a fan beam, a slice of data is collected for each clockwise and counterclockwise movement of the radiation source 24. The radiation source 24 may be moved continuously around the cargo container 30, from position A to position K and back again, or it may be moved in steps. The steps may correspond to some or all of the positions A-K, or not, as well as other positions. It may take about one minute to move the radiation source from position A to position K, if moved continuously. If moved in steps, it may take longer. The cargo container 30 can be moved continuously or in steps as the radiation source 24 is moved continuously or in steps.

Prescanning may be conducted at one or a few positions of the radiation source 24 between position A to position K, as the cargo container is moved through the scanning system 10, as discussed further below. For more accurate image reconstruction, data collection may take place at from 25 to at least about 2,000 positions, as the radiation source 24 is moved from position A to position K, as the cargo container 30 is moved through the scanning system 10, depending on the desired resolution of resulting images, the desired total scanning time for the container object, the detector readout rate of the detector, and the cost of the system 10. Higher detector readout rates enable faster scanning of the container 30, but increases the cost of the system 10. Scanning with a cone beam is also faster than scanning with a fan beam, because of the larger volume encompassed by the cone beam. Container scanning speeds also depend on the length of the container. Scanning a typical cargo container 30 having a length of 20 feet (6.1 m), a height of 8 feet (2.4 m), on a truck 32 with wheels having a diameter of 2 feet (61 cm), with a cone beam may therefore vary from about 1 minute to about 3 minutes, depending on the system, for example. Scanning the same cargo container 30 with a fan beam could take longer.

If it is desired to most accurately reconstruct CT images, a complete data set for CT reconstruction may be collected over an arc around the cargo container 30 equal to at least 180 degrees plus the fan angle of the emitted X-ray beams, as is known in the art. The detector array 26 would therefore need to extend at least that far around the cargo container (180 degrees plus the fan angle). For example, if the lateral arc of the beam is about 45 degrees, the detector array 26 should extend over an arc of at least about 225 degrees, as measured around the center C of the interior region 26a. CT reconstruction with less than a complete data set, as in digital tomosynthesis, may also be performed, if lesser image quality is acceptable. The scanning unit 10 may also be used to obtain radiographic images, in which case the detector array 26 can extend around a smaller arc and the source 24 need not be moved as far around the cargo container.

In one example, the horizontal rails 18, 20 define a coupling sleeve 42 for receiving the upper portion 22a of the robotic arm 22. The upper portion 22a of the robotic arm 22 may include a roller or other protrusion (not shown), for example, that may be moved through the coupling sleeve 42 by one or more motors coupled to the roller, for example, to move the robotic arm in a transaxial direction T across the horizontal rails 18, 20, in either direction, as is known in the art. The upper portion 22a of the robotic arm 22 may be moved through the coupling sleeve 42 by motor driven wheels or motor driven endless belts, for example. U.S. Pat. No. 2,659,827 shows an example of a motor driven system to move a robot arm laterally, for example, which is incorporated by reference herein. Other coupling and driving mechanisms known in the art may be used.

The upper and lower portions 22a, 22b of the telescoping arm 22 may be moved with respect to each other to raise and lower the radiation source 24, the robotic arm 22 may be moved transaxially across the rails 18, 20, the head end 32 may pivot the radiation source about the pivot 34, and the head end 32 may be rotated about the axis 36, simultaneously, or separately in steps.

Figure 3A:
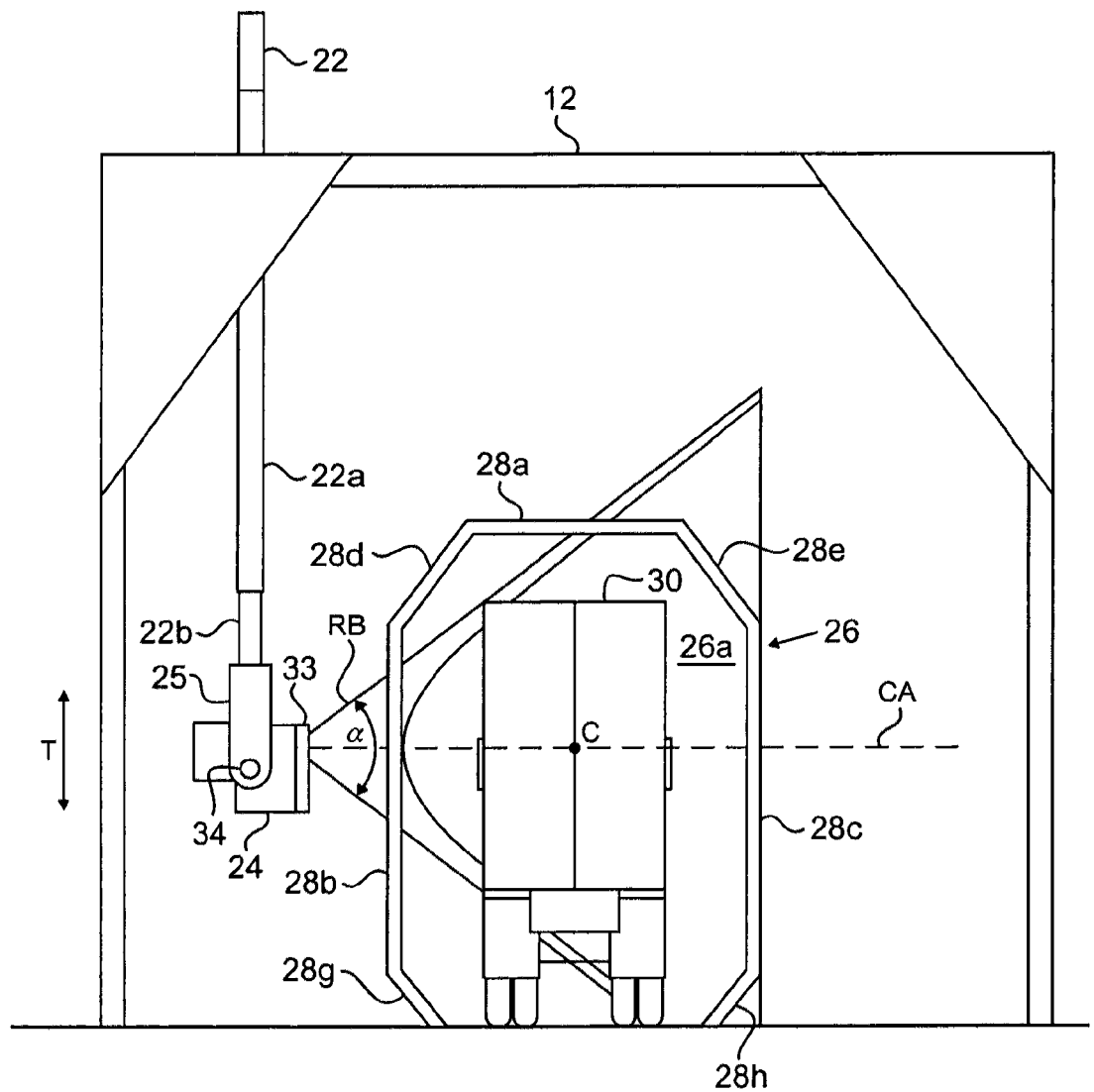
FIGS. 3a-3c are rear schematic views of the scanning unit, of FIG. 1, showing the robotic arm and radiation source in three respective positions as the radiation source is moved around the truck.
Figure 3B:
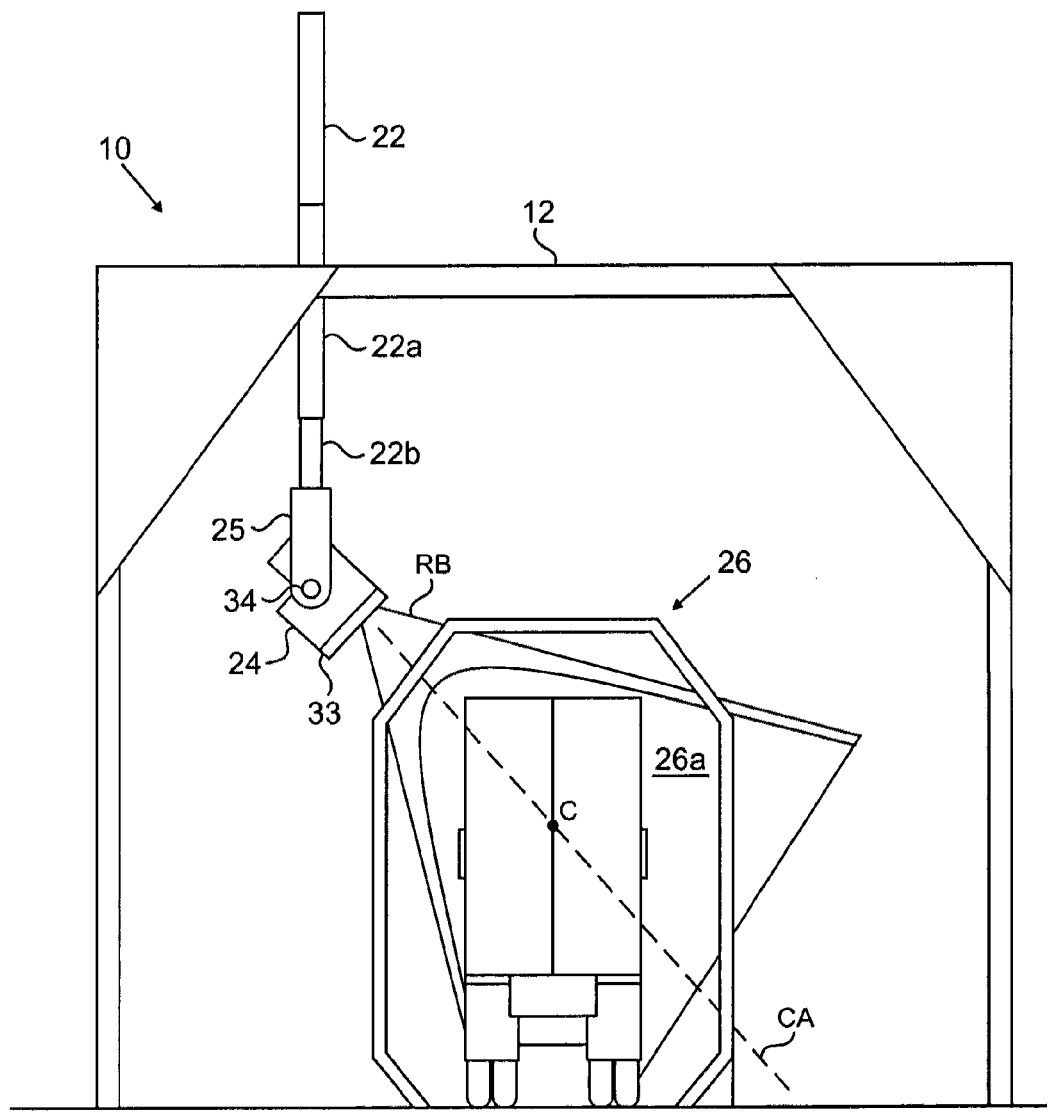
Figure 3C:
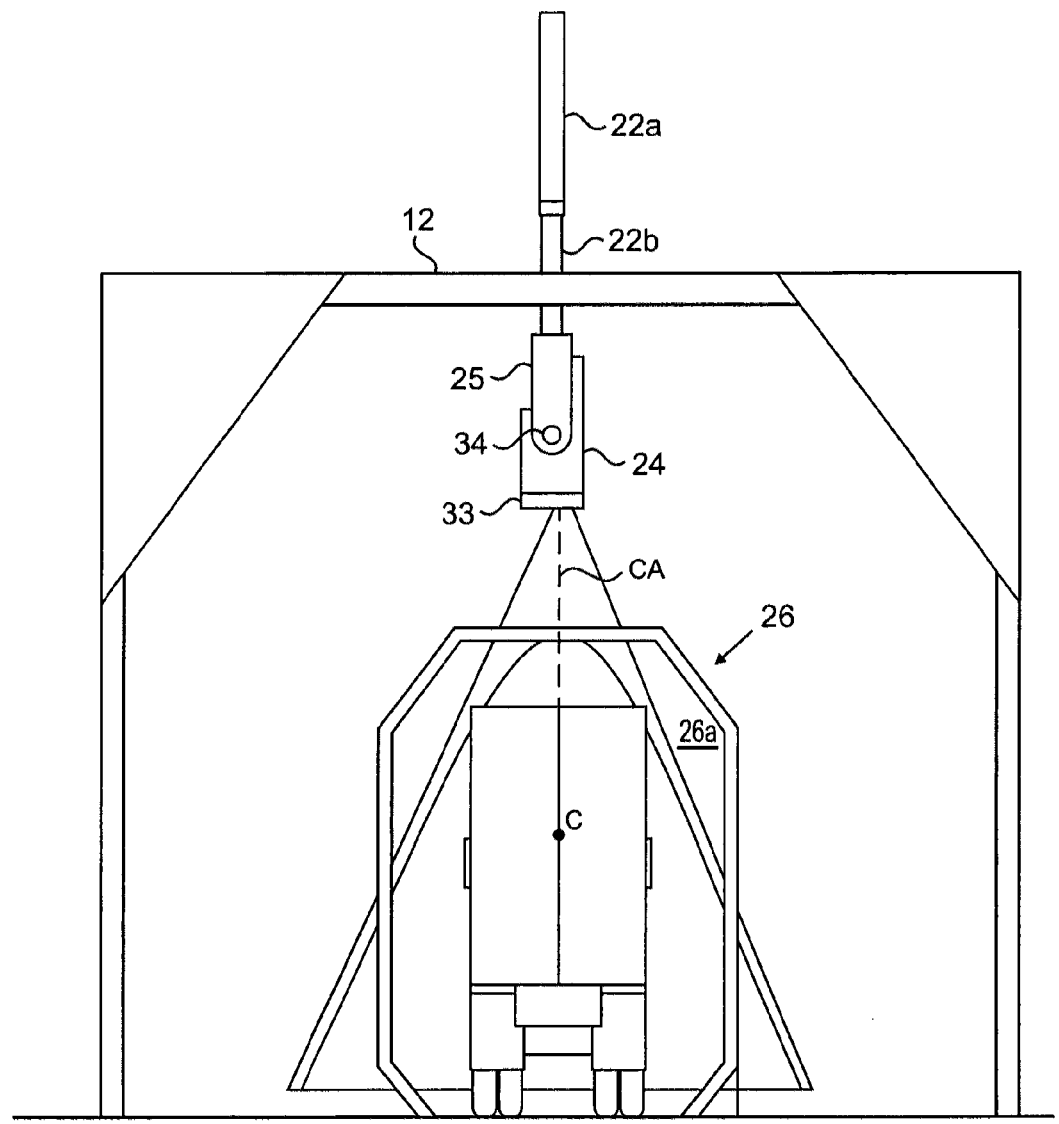

FIGS. 3a-3c are rear schematic views of the scanning unit 10, cargo container 30 and the truck 32 of FIG. 1, showing the robotic arm 22 and radiation source 24 in three respective positions as the source is moved around the truck. In this example, the detector array 26 comprises all the rectilinear sections 28a-28g. As discussed above, the top rectilinear panel 28a is optional. The radiation beam RB is wide enough and positioned far enough from the cargo container 30 to encompass the entire cargo container, although that is not required. The central axis CA of the beam RB intersects the center C of the region 26a, in this example.

In FIG. 3a, the radiation source 24 is shown positioned on the side of the cargo container 30 and the truck 32. The radiation source 24 is pivoted about the pivot 34 so that the radiation beam RB emitted by the source has a vertical central axis CA intersecting the center C of the region 28. The radiation beam RB is wide enough to encompass the entire cargo container 34. In FIG. 3b, the radiation source 24 has been moved upward by retracting the telescoping arms 22, moving the robotic arms 22 to the right, and pivoting the source 24 downward so that the radiation beam RB continues to fully encompass the cargo container 30 and the central axis CA continues to intersect the center C of the interior region 26a. In FIG. 3c, the radiation source 24 has been moved above the top rectilinear panel 26a by further retracting the telescoping aims 22, moving the arms 22 to the right, and pivoting the source 24 downward. In each position, and in intermediate positions, the radiation beam RB continues to fully encompass the cargo container 30 the central axis CA of the radiation beam RB continues to intersect the center of the region 28.

The cargo container 30 may be stationary while being scanned. The cargo container 30 may be moved incrementally (in steps) by the conveyer system CS, after each scan. For example, after the radiation source is moved from position A to position K, the cargo container may be moved one step. Then the cargo container 30 may be scanned again while moving the radiation source from position K to position A. Alternatively, the cargo container may be stationary so that the same position of the cargo container 30 is scanned while the radiation source is moved from position K to position A. Then the cargo container 30 may be moved one step by the conveyor system CS to scan the next portion of the cargo container. The width of a step may be less than the width "W" of the detecting portion of the detector panels 28, so that the volume of one portion of the cargo container being scanned overlaps the volume of an adjacent portion. Portions of the cargo container 30 are thereby less likely to be skipped during scanning, as the cargo container is moved through the scanning system. Instead of moving the cargo container 30 in steps, the container may be moved continuously while the radiation source is moved between positions A-K. Helical CT images may thereby be reconstructed.

Since the detector array 26 is between the radiation source 24 and the cargo container 30 in this example, the radiation beam RB must be transmitted through at least certain portions of the detector array before reaching the container, with sufficient energy to also penetrate through the cargo container. The detector attenuation must therefore be low enough to allow sufficient radiation to pass through the detector. At energy levels of the radiation beam from 1 MeV to 10 MeV, for example, a detective quantum efficiency ("DQE") of about 2% to about 30% may be used, for example. The DQE of the side detector panels 28b, 28c, and the top panel 28a, through which radiation must pass before scanning the container 30, may be less than the DQE of the bottom detector panel 28, where this is not the case. In one example, the DQE of the side panels 28b, 28c may be 10% while the DQE of the bottom panel 28f may be 20%, for example. While the overall signal-to-noise ratio of the image may be decreased because of the lower DQE of the side detectors 28b, 28c, the double sampling of lateral voxels (the volume elements measured from the left side and the right side, and corresponding lateral voxels measured from the right side to the left side) will compensate to some degree.

The detector array 26 may be electrically coupled to the computer 50, which reconstructs the data output by the detector array 26 into images, as discussed further below. Analog-to-digital converting devices and other electronic components are provided as required. The computer 50 is coupled to a display 52 that displays the reconstructed images.

The computer 50 may store the reconstructed images in a database, along with identifying information about each truck 32 and/or cargo container 30, such as the license plate and/or Container ID Number, and other useful information, such as the date that the truck container is scanned. The operator of the scanning unit 10 may enter the relevant information through a keyboard (not shown) or the information can be scanned or otherwise entered automatically.

The conveyor system CS may be any one of the types of conveyor systems known in the art. For example, the conveyor system CS may comprise a reversible conveyor belt, which moves the truck/container through the scanning unit in a forward and reverse direction. Alternatively, one or more cables may be connected to the front and rear of the truck or container to pull the truck/container through the scanning unit 10 in both forward and backward directions. Reversibility allows for rescanning of the whole 32 truck/container 30 or of a suspect region, if desired. The truck 32 may be pulled through the scanning unit 10 by the cables in either direction while in neutral. Mechanically driven rollers may also be used. The belt or track may be driven by one or more motors (not shown).

Figure 4:
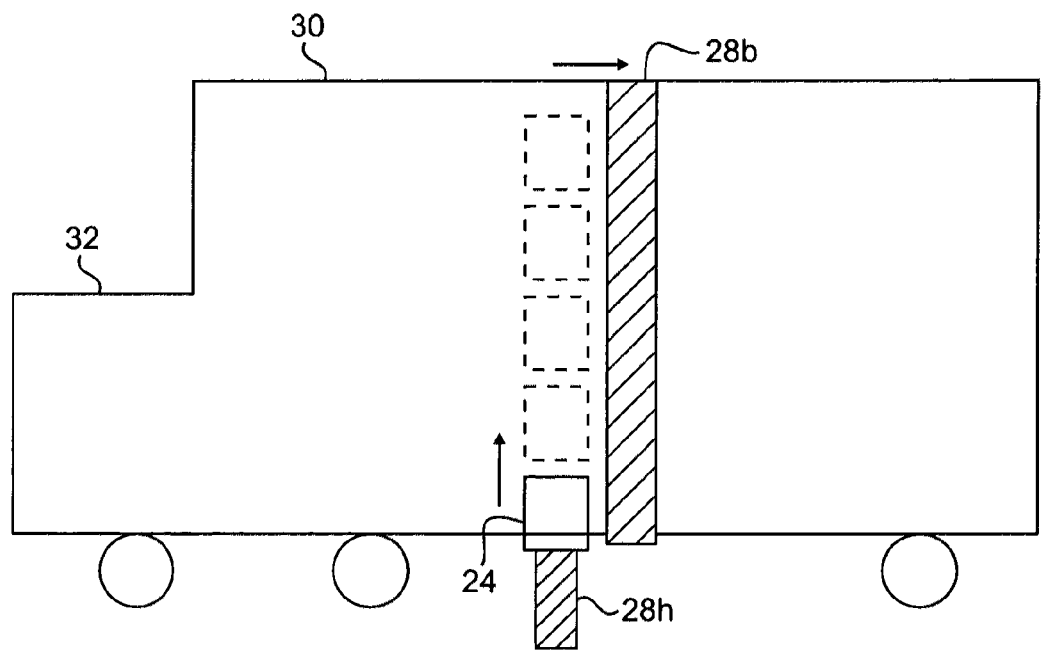
FIG. 4 is a side view of a schematic representation of a cargo container moving through the detector array, wherein the panel is moved out of the way of the radiation source.

Instead of directing the radiation beams through the panels 28 of the detector array 26, as in FIGS. 1-3c, individual panels 28 of the detector array 26 may be moved out of the path of the radiation beam RB when the radiation source 24 is positioned adjacent to the panel. FIG. 4 is a side view of a schematic representation of a cargo container 30 moving through the detector array 26, where the panel 28b is moved sideways or laterally, along the axial direction X of the scanning unit 10, away from the radiation source 24 and the radiation beam RB. The panel 28b may be moved in other directions, as well. Subsequent positions of the radiation source 24 as the radiation source 24 is moved, are shown in phantom. The radiation beam RB generated by the radiation source 24 can now directly scan the cargo container 30 without the beam RB going through the panel 28b.

After the radiation source 24 is moved away from the displaced panel 28b, the cargo container 30, the panel is moved back into its initial position, in order to detect radiation transmitted through the cargo container when the radiation source is on the opposite side of the container. When the radiation source 24 is on the opposite side of the cargo container 30, the detector panel 28c (shown in FIG. 2) may be moved laterally, along the axial direction X of the scanning unit 10, away from the radiation source 24 and the path of the radiation beam RB.

Figure 5A:
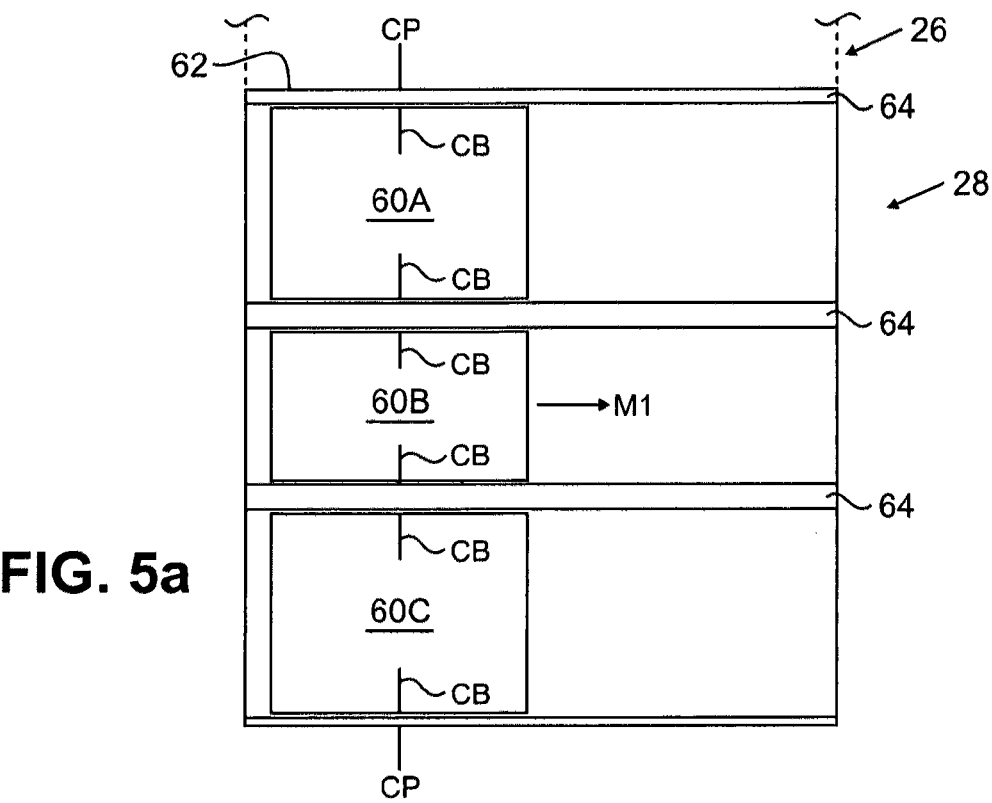
FIG. 5a is a side view of another example of a detector panel comprising a plurality of detector modules supported by a frame.

Detector modules may be moved instead of detector panels. FIG. 5a is a side view of another example of a detector panel 28 comprising a plurality of detector modules 60A, 60B, 60C movably coupled to a frame 62. In this example, the modules 60A, 60B, 60C are moved individually. A panel of modules may be moved together, as well, as in the schematic representation of FIG. 4. The upper and lower edges of each detector module 60A, 60B, 60C are positioned along horizontal tracks 64 supported by the frame 62, for example. The detector modules 60A, 60B, 60C may engage the tracks by gears driven by a motor (not shown), for example, to move the detector modules/panels horizontally along the tracks. Other mechanisms may be used to move the detector modules/panels, such as other mechanical mechanisms, or pneumatic mechanisms, for example. FIG. 5a shows three detector modules 60A, 60B, 60C in first positions lying along the central plane CP of the detector array 26. As above, the central plane CP extends perpendicular to the page in this view. The central plan CP is aligned with the central axis CB of each panel. The central axis bisects each detector module 60A, 60B, 60C in this example.

Figure 5B:
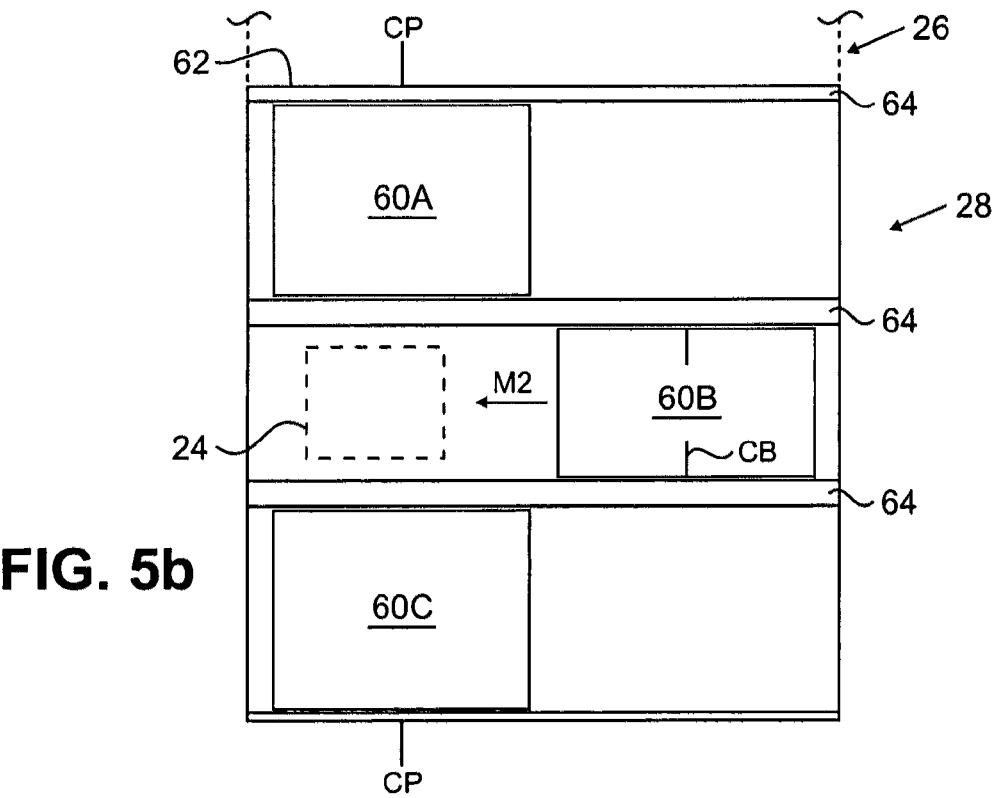
FIG. 5b is a side view of the detector panel of FIG. 5a, when the radiation source, shown in phantom, is in front of the first position of the second panel B.

FIG. 5b is a side view of the detector panel 28 of FIG. 5a, when the radiation source 24, shown in phantom, is in front of and faces the first position of the module 60B. The second panel 60B has been moved along the horizontal tracks 64 along the direction of the arrow M1 in FIG. 5a, to a second position where the central axis CB of the detector module 60B is not aligned with the central plane CP, and the module is out of the way of the radiation source 24. When the radiation source 24 is moved away from the first position of the module 60B to face another module, the module 60B, is moved from its second position to its first position along the arrow M2 in FIG. 5b, and a next module is moved to its second position. To enable scanning without any attenuation of the radiation beam RB, a respective module needs to be moved sufficiently so that it is completely outside of the path of the radiation beam so that no portion of the beam is intercepted. If some attenuation around the periphery of the radiation beam RB is acceptable, a module need not be moved as far.

Alternatively, all the detector panels/modules may be in second positions out of the plane of the path of the radiation source 24 and the appropriate detector panel/module may be moved into position opposing the radiation source 24 to detect the radiation beam after transmission through the cargo container 30. For example, in FIG. 5*a*, the detector module 60B may be moved into position along the arrow M1, as shown in FIG. 5*b*, to detect radiation emitted by the radiation source 24 when the radiation source is on the opposite side of the cargo container 30.

Figure 6:
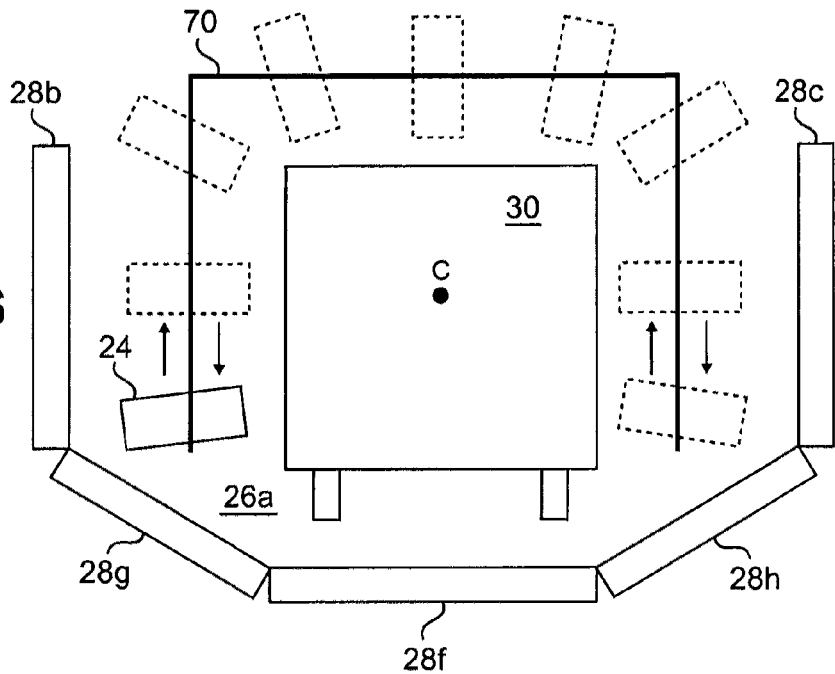
FIG. 6 is a rear view of a schematic representation of another example of a scanning unit in accordance with an embodiment of the invention, in which the detector array is outside of the path of the radiation source, and within the region encompassed by the frame.

FIG. 6 is a rear view of a schematic representation of another example of a scanning unit 10 in accordance with an embodiment of the invention, in which the detector array 26 is outside of the path 70 of the radiation source 24, and within the region 12*a* encompassed by the frame 12. The robotic arm 22 moves the radiation source 24 over the rectangular path 70 as the radiation source 24 is pivoted to aim the center axis CA toward the center C of the region 26*a* or the center of the cargo container 30, as described above. In FIG. 6, the radiation source 24 is shown in a first position. Subsequent positions of the radiation source 24 as it is moved around the cargo container are shown in phantom. In this example, the radiation beam 24 does not pass through the detector array 26. In addition, the radiation source 24 is also closer to the cargo container 30 and to the detector array 26. Since the detector array 26 is outside of the path 70 of the radiation source 24 and encompasses a larger region than in the example of FIG. 1, more and/or larger detector panels may be required than in the examples of FIGS. 1-3*c*.

Figure 7:
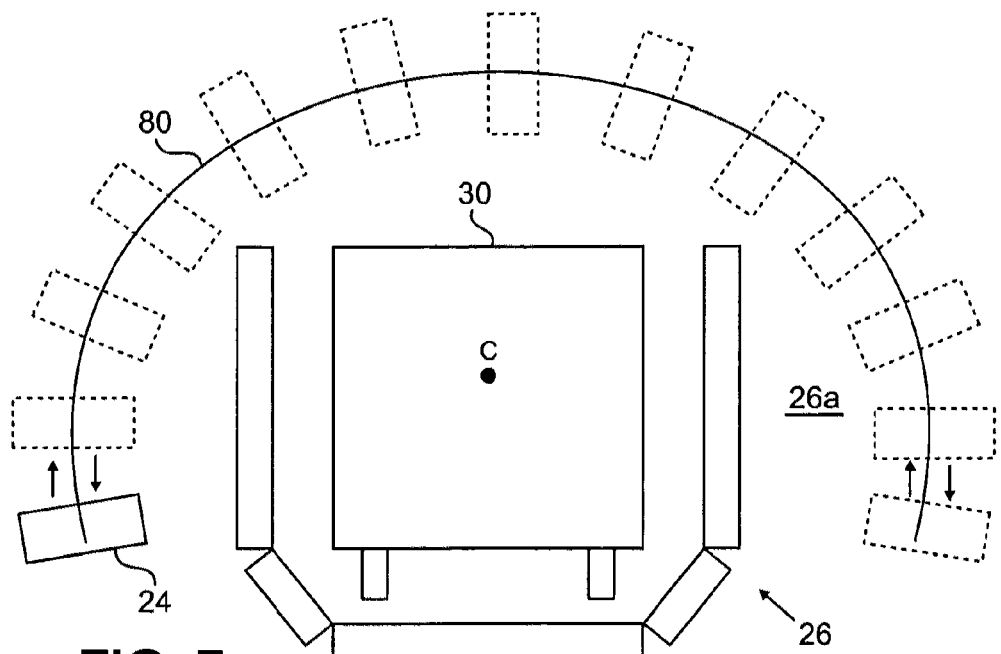
FIG. 7 is a schematic representation of a rear view of the scanning unit, wherein the robot arm 22 (not shown) moves the radiation source around an arcuate or semi-circular path.

FIG. 7 is a schematic representation of a rear view of the scanning unit 10, wherein the robot arm 22 (not shown) moves the radiation source around an arcuate or semi-circular path 80. Arcuate paths may be followed in any of the configurations shown herein.

In any of the embodiments described above, it may be advantageous to conduct a prescan of the cargo container 30 and/or the truck 32 to determine whether any suspect regions are present. In one example, the prescan is conducted by moving the radiation source to position F in FIG. 2 and FIG. 3C. Other positions may be selected, instead. The cargo container 30 and/or the truck 32 are then moved through the scanning unit 10 continuously or in steps by the conveying system CS, and scanned. The collimator 33 may define a radiation beam wide enough to encompass the width of the cargo container 30, as shown in FIG. 3C. The radiation beam may be a cone beam or a fan beam. If desired, the entire cargo container 30 and/or truck 32 may be scanned at one or more additional positions, such as at position C in FIG. 3*a*, and/or position J. In either case, prescanning is much faster than the scanning required for CT reconstruction and, since most trucks 32/cargo containers 30 do not contain contraband, in most cases prescanning is sufficient inspection. The resulting radiographic scan images may be reviewed visually and/or automatically. If any suspect regions are identified, the truck 32/cargo container 30 is positioned for CT scanning of the suspect region and a certain volume around the suspect region by moving the radiation source 24 between positions A-K of the radiation source 24 and moving the truck/container, as described above. If no suspect regions are identified, the truck 32 and the cargo container 30 are allowed to continue in the stream of commerce. Line scans could also be used to prescan, as is known in the art. The scanning rate of the scanning unit 10 is thereby increased.

Figure 8:
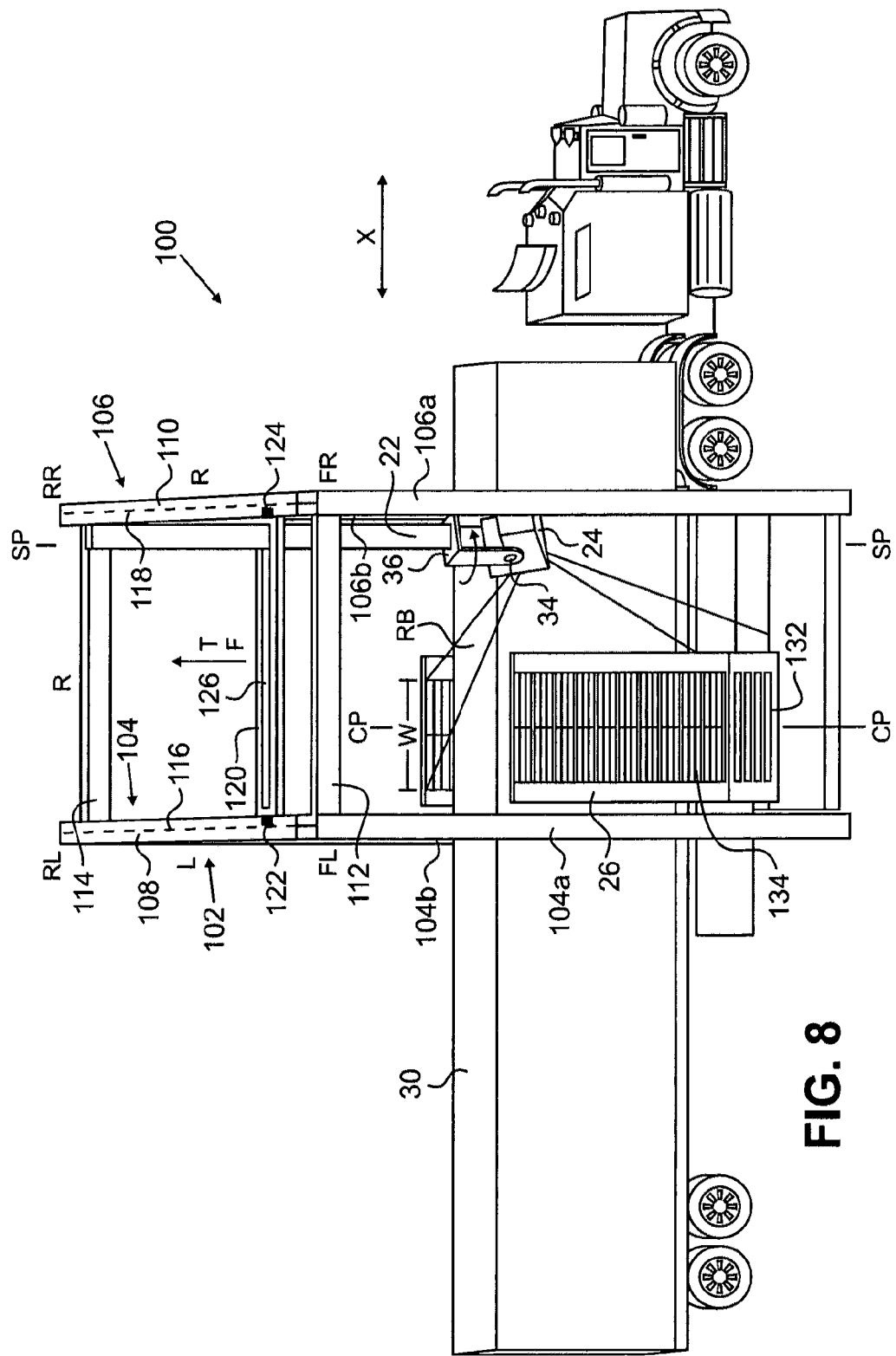
FIG. 8 is a side view of a cargo scanning unit in accordance with another embodiment of the invention, where the radiation source is offset from a central plane of the detector array.

FIG. 8 is a side view of a cargo scanning unit 100 in accordance with another embodiment of the invention, in which the problem of scanning through a detector array 26 is overcome, at least in part, by offsetting the radiation source 24 from the central plane CP of the detector array, which is perpendicular to the page in FIG. 8. The radiation source 24 can thereby direct the radiation beam RB directly to and through the cargo container 30 to a detector panel 130 behind the container, without having to pass through another detector panel of the detector array 26, as in FIG. 1, for example. The radiation beam RB is not, therefore, attenuated by the detector array 26 before scanning the cargo container 30. In the example of FIG. 8, components common to the scanning unit of FIG. 1 are commonly numbered. There may be some attenuation if the offset is not sufficient, which may be tolerable in some applications.

In this example, the scanning unit 100 comprises a frame 102 comprising two aligned frame units 104, 106. Each frame unit 104, 106 comprises opposing vertical sides 104*a*, 104*b*, and 106*a*, 106*b*, respectively (the vertical sides 104*b*, 106*b*, which are in the rear of this view, are partially obscured). The vertical sides 104*a*, 104*b* and 106*a*, 106*b* are connected by a respective horizontal rails 108, 110. The frame units 104, 106 are connected to each other by respective connecting beams 112, 114. A cross-beam 120 is movably supported between the horizontal rails 108, 110, for movement across the rails. In this example, the cross-beam 120 is perpendicular to the horizontal rails. The detector array 26, which has an open top, is within the interior volume encompassed by the opposing frame units 104, 106, in FIG. 8. As above, the radiation source 24 is pivotable about the pivot 34 and rotatable about the axis 36.

To movably support the cross-beam 120 in this example, each horizontal rail 108, 110 defines a groove or sleeve 116, 118 (shown in phantom) facing the respective groove in the opposing rail. The cross-beam 120 has opposing ends 122, 124 supported in the grooves 116, 118 so that the cross-beam can be moved across the rails 108, 110. The ends 122, 124 may comprise rollers or protrusions driven by motor driven wheels or motor driven belts, for example, as described above with respect to movement of the robotic arm 22 across the rails in FIG. 1.

The robotic arm 22 is supported by the cross-beam 120. Movement of the cross-beam 120 across the horizontal rails 108, 110 moves the robotic arm 22 and the radiation source 24 in a transaxial direction T, across the rails. Other configurations may be provided to move the cross-beam 120 across the rails 108, 110, as well.

The cross-beam 120 comprises an open interior 126. Grooves or sleeves (not shown) may also be provided along the lengths of facing surfaces of the cross-beam 120 to receive rollers or protrusions (not shown) on the robotic arm 22 similar to the grooves 116, 118 and protrusions 122, 124 of the horizontal rails 108, 110 and cross-beam 120, respectively. The rollers or protrusions may be driven by motor driven wheels or belts, as described above with respect to movement of the cross-beam 120 across the horizontal rails 108, 110 and movement of the robotic arm 22 across the rails in FIG. 1. The radiation source 24, is thereby moved across the cross-beam, between the frame units 112, 114. Other configurations may be provided to move the robotic arm 22 the cross-beam 120, as well.

The connecting beams 112, 114 and the cross-beam 120 separate the frame units 104, 106 by a sufficient distance for the robotic arm 22 and the radiation source 24, to be positioned sufficiently forward or behind the central plane CP of the detector array 26 so that at least a portion of the radiation beam can illuminate the cargo container 32 for scanning, without being intercepted by any portion of the detector array.

Movement along the cross-beam 120 also allows for lateral movement of the robotic arm 22 and radiation source 24 for prescanning, if desired, as discussed further below.

In the example of FIG. 8, the detector array 26 is positioned close to the first side of the frame and the robotic arm 22 and radiation source 24 are positioned close to a second side of the scanning unit 110, offset from the central plane CP. In the view of FIG. 8, the first side is the left side L and the second side is the right side R. The positions of the detector array 26 and the radiation source 24 may be reversed. The cross-beam 120 is movable across the rails 108, 110 between forward F and rearward R positions of the scanning unit 100 in the view of FIG. 8 to move the radiation source 24 through a second plane SP different from the central plane CP. In this example, the second plane SP is parallel to the first plane CP and is perpendicular to the page. The cross-beam 120 is positioned in a front right position FR of the scanning unit 100 in the view of FIG. 8. The robotic arm 22 is also movable between the right R and left L sides of the frame 102.

As above, the radiation source 24 is moved around the cargo container 30 to scan the container at a plurality of angles to obtain enough images for CT reconstruction. The rear schematic view of FIG. 2 is applicable to this embodiment, as well, and will be referred to in the following discussion.

The radiation source 24 is moved from position A to position D in FIG. 2, with the cross-beam 120 in the front right FR position of FIG. 8, by retracting the telescoping arm 22, as discussed above. To move from position D to position H, the cross-beam 120 is moved towards the rear, right position RR, in a transaxial direction as indicated by the arrow T. When in the rear, right position RR, the radiation source 24 is moved from position H to position K by extending the telescoping arm 22, as discussed above.

While in position A in FIG. 2, the radiation source 24 is aimed toward the detector panels 130 (corresponding to detector panels 28c, 28h in FIG. 2) behind the cargo container 30 in this view, as shown in FIG. 8. The radiation source 24 may be aimed by rotating the source 24 about the axis 36 of the robotic arm 22. If starting at an angle aligned with the plane SP, the radiation source 24 may be rotated counter-clockwise from about 30 degrees to about 60 degrees, for example. The angle may depend, in part, on the size of and distances between the system components.

The radiation source 24 may also be rotated about the pivot 34, as needed. The collimator 33 defines an appropriately sized and shaped cross-beam for scanning and detection by the rear portion 130 of the detector array 26.

When at or near position D, the radiation source 24 is rotated counterclockwise about the axis 36, 90 degrees with respect to the plane SP toward the detector array 26. The radiation source 24 is also rotated about the pivot 34 to face toward the bottom portion 132 of the detector array 26 (corresponding to at least detector panels 28f and possibly detector panels 28g and 28h in FIG. 2). The angle depends, at least in part, on the size of the system components and the distance from the central axis CP of the detector array 26 to the second plane SP. The collimator 33 defines the size and shape of the radiation cone beam R so that it will be appropriate for detection by the bottom portion 132 of the detector array 26.

The robotic arm 22 then moves the radiation source 24 from position D to position H, by moving the cross-beam 120 from the front right position FR to the rear right position RR of the frame 102. The radiation source 24 in this example is moved in a second plane SP parallel to the central plane CP of the detector array 26.

When at or near the position H, the radiation source 24 is rotated about the axis 36, and the pivot 34 to direct the radiation source towards the front detector panels 134 of the detector array 26 (corresponding to detector panels 28b and 28g in FIG. 2). The radiation source 24 may be rotated counterclockwise about the axis 36 to an angle of from about 120 degrees to about 150 degrees with respect to the second plane SP, for example. The collimator 33 also defines an appropriately sized and configured cone beam. The radiation source 24 is then moved from position H to position K by extending the telescoping arm 22, as discussed above.

The movement of the cross-beam 120, the rotation of the radiation source 24 about the axis 36 and the pivot 34, and the collimator 33 are controlled by a suitably programmed and/or configured processor 40 or the computer 50, as discussed above.

Since the central plane CP of the detector array 26 and the plane SP through which the radiation source 24 is moved are not aligned, different portions of the cargo container 30 are scanned by the radiation beam RB as the radiation source 24 is moved between positions A and K of the radiation source 24. In this example, the three-dimensional volume scanned by the radiation source 24 as the source is moved from position A to position K is a partial cone-like volume, as would be apparent to one of ordinary skill in the art. Sufficient data will not, therefore, be collected to reconstruct a CT image of a volume of the container 30 by scanning by the radiation source 24 between positions A to K. The volume may comprise other shapes through the different portions of the cargo container 30, as well.

Figure 9A:
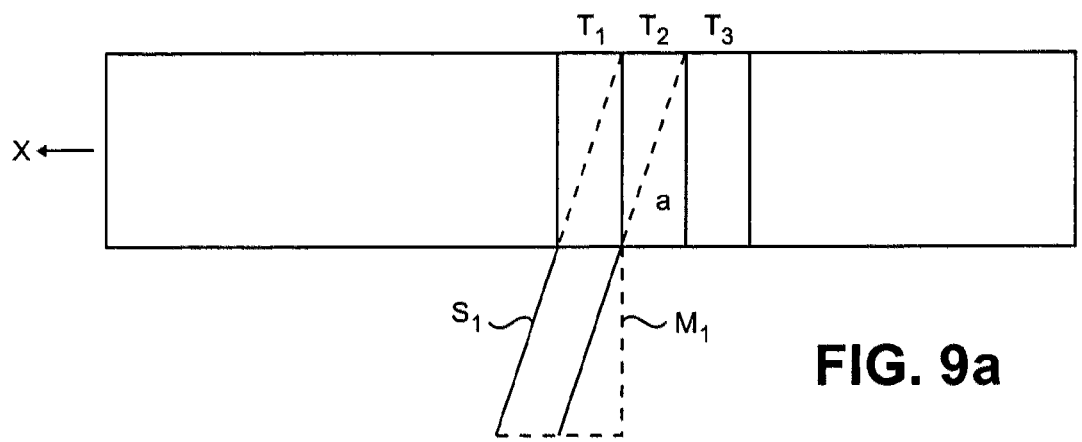
FIG. 9a is a schematic representation of a cross-sectional view of a cone-like volume scanned in the embodiment of FIG. 8.

FIG. 9a is a schematic representation of a cross-sectional view of the partial cone-like volume of the cargo container 30. FIG. 9a shows three (3) vertically oriented rectangular portions $T_1, T_2, T_3$ of the cargo container 30. The radiation beam RB intercepts only part of volumes $T_1$ and $T_2$. For example, portion "a" of the region $T_2$ is not scanned. To collect the additional data necessary to reconstruct CT images of region $T_2$, in one example, after the radiation source 24 scans the cargo container 30 from position A to position K, the container is moved by the conveying system CS, to scan another volume that overlaps the first volume, providing sufficient additional data to reconstruct CT images. In the illustrated example, the cargo container 30 is moved backward the width W of the detector array 26 in the direction of the arrow Z. Where the width W of the detecting portion of the detector array 26 is 3 feet (0.90 meters), for example, the truck 32/container 30 may be moved back 3 feet (0.90 meters).

Figure 9B:
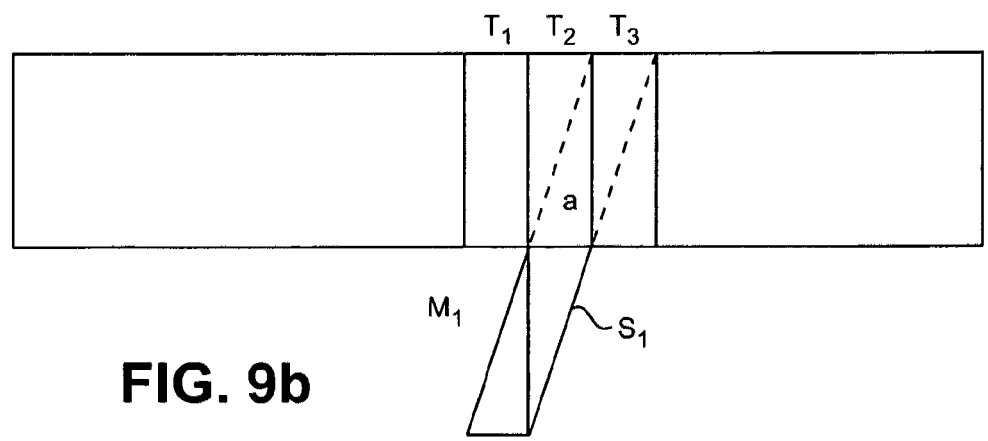
FIG. 9b is a schematic representation of a cross-sectional view of a partial conical volume when the cargo container moved backwards one-half a width of the detector array.

FIG. 9b is a schematic, cross-sectional view of the cargo container moved backwards one width of the detector array. Then the cargo container 30 is scanned as the radiation source 24 is moved from position K to position A, moving the cross-beam 120 forward from the rear right position RR to the forward right FR position. A second conical shaped volume is thereby scanned, which partially overlaps the first volume. The portion "a" of the volume $T_2$ not scanned while the cargo container 30 is in the position of FIG. 9a, is scanned in the position of FIG. 9b. Together the first and second conical volumes may provide sufficient data to reconstruct a CT slice of the volume $T_2$, based on the first and second slices. It may be necessary to scan additional adjacent slices by moving the cargo container 30 additional increments, to obtain sufficient data to reconstruct the volume $T_2$. The portions of the first and second conical volumes that are outside of this rectangular volume may contribute data to the reconstruction of adjacent rectangular volumes, if the truck 32/cargo container 30 is moved another width W forward and/or backward by the conveying system CS. It may be advantageous for adjacent scanning volumes to overlap. The cargo container 30 may therefore be moved less than the width W of the detector array 26. It may be moved from one-quarter to one width W, for example, such as one-half width W, for example.

Prescanning may be conducted in the scanning unit 100 of FIG. 8 by moving the cross-beam 120 in a transaxial direction to be aligned with a center of the detector array 26 and moving the robotic arm 22 in the axial direction to the left in the view of FIG. 8, to be aligned with the center plane CP of the detector array. The truck 32 of cargo container 30 is then moved through the scanning unit 100 continuously or in increments, as described above. If a suspect region is found in the resulting radiographic images, then the portion of the truck 32/cargo container 30 containing the suspect region is moved into position for CT scanning. The cross-beam 122 is moved to the right forward position RF, of FIG. 8, and CT scanning conducted, as described above. If prescanning and axial movement along the axial direction X is not desired, a frame 12, as in FIG. 1, may be positioned forward or behind the detector array 24.

Figure 10:
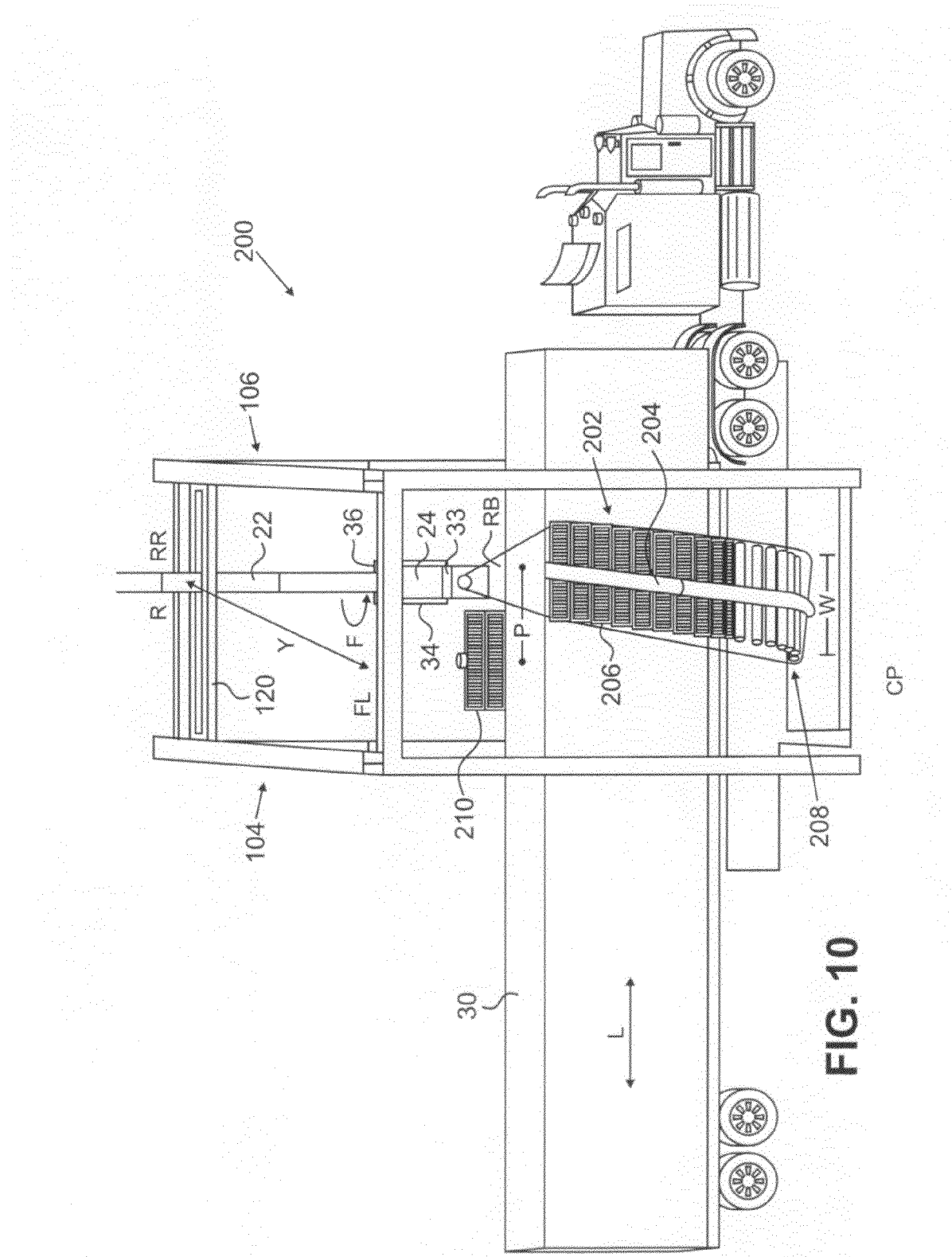
FIG. 10 is another cargo scanning unit, in accordance with an embodiment of the invention, where the detector array is a partial helix.

FIG. 10 is another example of a cargo CT scanning system 200 that is similar to the system 100 of FIG. 8, except that the detector array 202 is configured as a partial helix. FIG. 12 is a top view of the helical scanning system 200. The top of the helical detector array 202 is open. A helical bar 204 is shown supporting the modules of the detector array 202. Each module is slightly offset from an adjacent module in this example, to define the helix. The robotic arm 22 is programmed to pivot the radiation source 24 to be aimed at portions of the helical detector array 202 as the radiation source 24 is moved around the cargo container 30, as above. Elements common to the cargo scanning system 10 and/or the cargo scanning system 100 of FIGS. 1 and 8 are commonly numbered.

Figure 11:
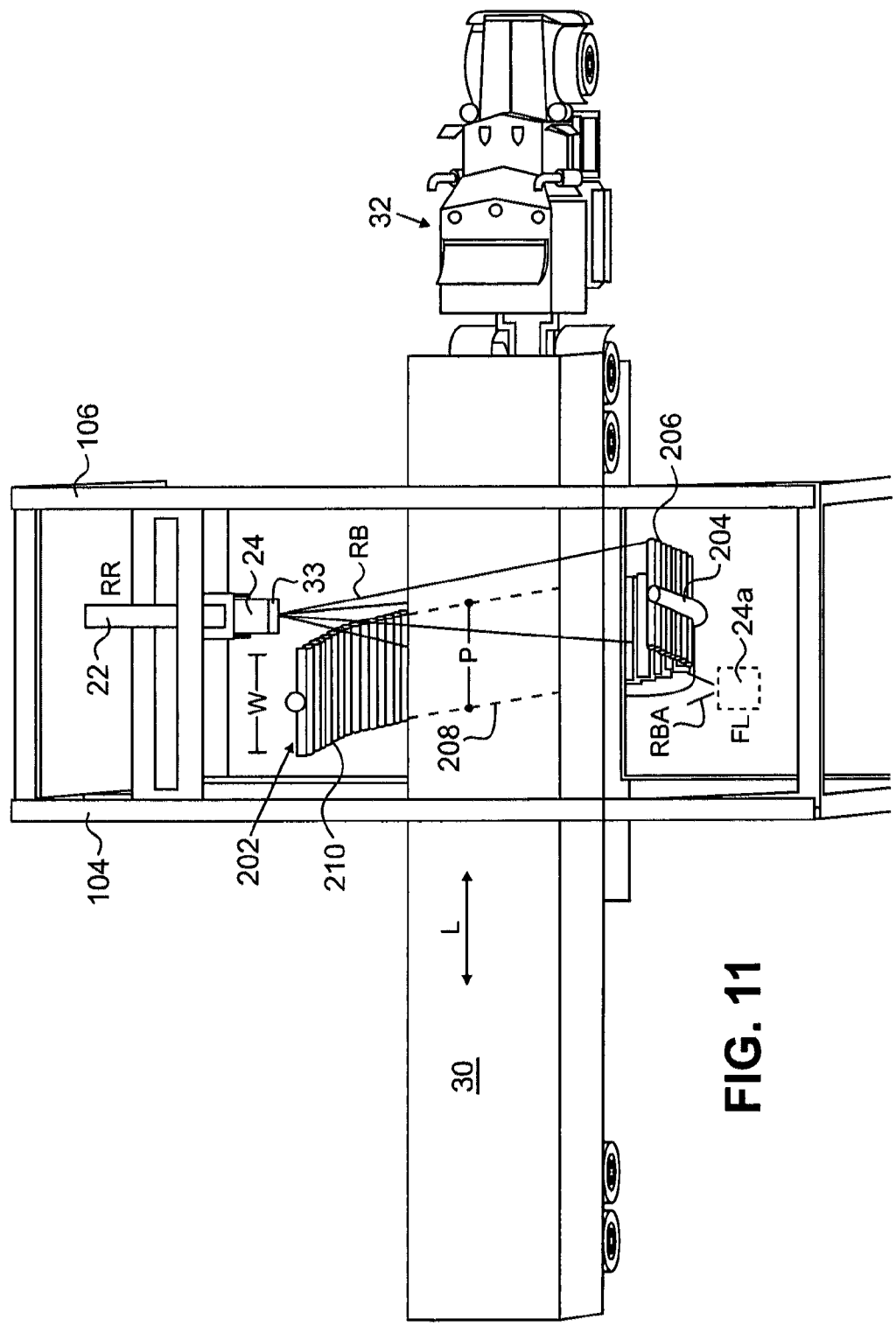
FIG. 11 is a top view of the scanning system of FIG. 10.

In this example, the helical detector array 202 is positioned approximately midway between the frame units 104, 106. The robotic arm 22 and radiation source 24 are shown in a rear right position RR, aimed toward the forward portion 206 of the detector array 202. The radiation source 24 may be moved from position K to position H (see FIG. 2) by retracting the telescopic arm, while being oriented as shown in FIGS. 10 and 11. The collimator 33 may define a rectangular or other shaped cone beam to scan the cargo container 30 and be detected by the forward portion 206 of the detector array 202. There might be some attenuation of the radiation beam RB by the rear portion 206 of the detector array 202 when the radiation source 24 is in the rear right RR position, depending on the pitch of the detector array 202 and the size of the system components.

At or near position H, the radiation source 24 is rotated about the axis 36 and the pivot 34 to aim at the central portion 208 of the detector array 202, the periphery of which is shown in phantom in FIG. 11. The collimator 33 defines a suitably shaped cone beam RB. The radiation source 24 is then moved from the rear right position RR to the front left position FL, in order to scan from position H to position D, by advancing the cross-beam 120 to the forward position F while moving the robotic arm 22 to the left, across the cross-beam. The robotic arm 22 and the radiation source 24 follow a diagonal path P from the rear right position RR to the forward left position FL. The radiation source 24 may be rotated about the axis 36 and the pivot 34 while it is being moved from position H to position D to adjust the aim, as necessary.

At or near position D, while the robotic arm 22 and the radiation source 24 are at the forward left position FR, the radiation source 24 is aimed at the rear portion 210 of the detector array 202, by rotation about the axis 36 and pivoting about the pivot 34. It is noted that, as above, depending on the pitch of the helix and the size of other system components, there might be some attenuation of portions of the radiation beam by the forward portion of the detector array 202. The collimator 33 defines a suitable cone beam. The robotic arm 22 moves the radiation source 24 from position D to position A by extending the telescoping arm, as discussed above.

The volume scanned across the helical detector 206 may not be uniform. In this example, it is apparent from FIG. 12 that the volume of the container 30 scanned by the radiation beam RB while the radiation source is in the rear right position RR, will be different than the volume scanned by the radiation beam RBA when the radiation source 24a is in the front left position FL. Sufficient data for CT reconstruction of the scanned volume or a portion of the scanned volume, may not, therefore, be collected. To collect additional data, the truck 32/cargo container 30 may be moved by the conveyor system CS while the radiation source 24 is moved diagonally along the path Y in FIG. 10. In one example, while the radiation source 24 is moved rearwardly from position K to position A, from the rear right position RR to the forward left position FL, along the diagonal path Y in FIG. 11, the cargo container 30 is moved backward so that the same, or substantially the same volume of the container is scanned. If scanning starts with the radiation source 24 at the front left position FL, so that the radiation source moves forward along the diagonal path Y to the rear right position RR, then the container 30 would be moved forward. The rearward or forward motion of the radiation source 24 along the axial direction X, while the radiation source is moved along the diagonal path, may be at the same speed as the speed the cargo container 30 is moved along the axial direction X, to scan the same or substantially the same volume. While the radiation source 24 is moved from the rear right position RR to the front left position FL, the container 30 may be moved a length corresponding to the pitch P of the helical detector array 206, in the rearward direction, for example. If the radiation source 24 is moved from the front left position FL to the rear right position, the container would be moved forward a length corresponding to the pitch P.

Prescanning may be performed in this embodiment in the same manner as in the embodiment of FIG. 8, by moving the radiation source to position F, by moving the cross-beam 120 and the robotic arm to a position above a center of the helical detector array 202 and/or a limited number of other positions, and moving the truck 32/cargo container 30 through the scanning unit 200.

The radiation source 24 may be a source of X-ray radiation, such as Bremmstrahlung, for example. To examine a cargo container 30 having a width greater than about 5 feet (1.5 meters) by a scanning unit 10, 100, or 200 in accordance with the embodiments of the invention, the X-ray source 24 may generate radiation having an average energy of at least 1 MeV and a peak energy of about 5 MeV to about 10 MeV, for example. The X-ray source 24 may be a linear accelerator, such as a Linatron® Linear Accelerator ("Linatron®"), having an accelerating potential in a range of about 6 MeV or more, available from Varian Medical Systems, Inc., Palo Alto, Calif. ("Varian"), for example. In the Varian Linatron®, 360 pulses are output per second. The Varian Linatron® has an opening angle of about 20-30 degrees, for example. Other X-ray sources may be used as well, such as electrostatic accelerators, microtrons and betatrons, for example. X-ray tubes may also be used, particularly for objects having a width less than about 5 feet (1.5 meters).

The radiation source 24 may emit radiation at angles up to about 180 degrees, which can be collimated to any desired shape by the collimator 33, such as a cone or fan beam. The radiation beam RB can be emitted from a point, along a line, or from a two-dimensional area to define the desired shape. The cone beam need not be a mathematical cone; it may be an arbitrarily shaped cone. Here, "cone beam" refers to an X-ray beam having longitudinal and lateral dimensions to illuminate a two dimensional detector. A cone beam can uniformly scan a larger volume of the cargo container per scan, as compared to a fan beam or a pencil beam, decreasing the time required to scan the entire cargo container 30.

Scanning the cargo container 30 at different energies in the megavoltage range may provide additional information concerning the material composition of the contents of the cargo container, as is known in the art. The radiation source 24 may be an interlaced multi-energy radiation source capable of generating radiation beams at two or more energies in the megavoltage range, such as the Varian Linatron® M™ series X-ray sources. An example of the Linatron® M™ radiation source is described in U.S. patent application Ser. No. 12/228, 350, which was filed on Aug. 12, 2008 and is incorporated by reference herein. Another example of an interlaced multi-energy source is the Varian Linatron K9, which is described in U.S. patent application Ser. No. 12/313,752, which was filed on Nov. 24, 2008 and is incorporated by reference herein. These X-ray sources may be switched between the two energies as they are moved from position A to position K. Alternatively, the radiation source 24 can scan at one energy while being moved from position A to position K, and the second energy while being moved from position K to position A, over the same region of the truck 32/cargo container 30. Linear accelerators that can emit X-ray radiation at two or more energy distributions are described in U.S. Pat. No. 6,366,021 B1, U.S. Pat. No. 4,382,208 and U.S. Pat. No. 4,400,650, for example, which are assigned to the assignee of the present invention and are incorporated by reference, herein. Dual energy analysis, as described in U.S. Pat. No. 7,257,108, which is also assigned to the assignee of the present invention and is incorporated by reference herein, may be used to identify nuclear materials, for example. Other dual energy analysis techniques known in the art may be used, as well.

In one example, the radiation source 24 is positioned about 15 feet (4.57 m) from the center C of the cargo container 30, for example, as the radiation source is moved around the cargo container. The cone beam RB may diverge over an angle α (See FIG. 3a) from about 20 degrees to about 60 degrees about the transaxial direction T of the scanning system 10 and from about 6 degrees to about 10 degrees in the axial direction X of the scanning system 10, about a vertical axis, for example. In FIG. 3a, the axial direction X is perpendicular to the page. In the example of FIG. 3a, the cone beam has an angle α of about 60 degrees. About 2 feet (61 cm) of the cargo container is illuminated by the radiation beam when the radiation source is at a distance of 15 feet (4.57 m) from the center of the region 28.

As is known in the art, the intensity of a cone beam or a fan beam having an energy greater than 1 MeV is greatest along the central axis of the beam and decreases with angular displacement from the central axis. Intensity also drops as distance from the cargo container increases. To increase the intensity of the radiation scanning the cargo container in regions of the container away from the central axis, the head end 25 of the robotic arm 22 may pivot the radiation source 24 about the horizontal pivot 34 and/or the head end may be rotated about the vertical axis 36. Pivoting about the horizontal pivot 34 and rotation about the vertical axis 36 may take place as the robotic arm 22 moves the radiation source 24 around the cargo container 30, or at each scanning location. If the robotic arm 22 moves in steps, then the cargo container 30 may be scanned at each location, at a neutral position of the radiation source 24, where the central axis CA of the radiation beam RB is aligned with the central plane CP of the detector array 26. The cargo container may also be scanned with the radiation source 24 pivoted laterally about the vertical axis 36, in a first, positive direction and/or with the radiation source pivoted laterally about the vertical axis in a second, negative direction. The radiation source 24 may be pivoted about the pivot 34 in positive and/or negative transaxial directions at each scanning location, as well.

Collimators (not shown) may also be provided between the cargo container 30 and the detector array 26 to block scattered radiation from reaching the detector elements of the detector array.

When the X-ray radiation is in the form of a cone beam, the detector array 26 may comprise one or more rows of two dimensional detector modules 34, as mentioned above, to detect X-ray transmission through the cargo container 14. Each two-dimensional detector module 34 comprises a plurality of rows and columns of detector elements, such as photosensitive elements, in a housing. The components of the modules, which are known in the art, are not shown. The photosensitive elements may be photodiodes, for example. If a fan beam is used, a single row of one-dimensional detectors (comprising a single row of detector elements) may be used.

The detector module 34 may comprise amorphous silicon ("aSi") detectors, for example. In a detector module 34, the amorphous silicon may be coated with an indirect detector that converts X-rays visible light, such as cesium iodide ("CsI"), gadolium oxysulfide ("GOS"), cadmium tungstate oxide ("CdWO$_4$"), plus a build-up plate, or with a direct detector that converts X-rays directly into electron pair holes, such as mercury iodide (HgI$_2$), lead iodide ("PbI$_2$"), or cadmium telluride ("CdTe").

Each detector module may have a width of at least about 20-40 cm, for example. The pixel size may be up to 0.5 cm, for example. The detector module 21 may be a 40 cm×30 cm aSi detector panel available from Varian Medical Systems Technologies, Inc., for example under the tradename PaxScan® 4030, for example. Other Paxscan detector panels may also be used. The detectors may be coupled to signal processing circuitry comprising a preamplifier stage with dynamically controllable signal gain, as described in U.S. Pat. No. 6,486, 808 B1, which is assigned to the assignee of the present invention and is incorporated by reference, herein. Modules may be positioned in one row, two adjacent rows, or more than two rows. A wider cone beam may be used with a detector array 26 with a larger width W. The detector modules may also comprise metal insulator semiconductor photodiode detectors, as described in U.S. Pat. No. 7,208,810 B2, which is also assigned to the assignee of the present invention. Other commercially available detector modules may be used.

As the radiation source 24 is moved around the cargo container, different detector modules will be illuminated by radiation. In one example, only those detector modules being illuminated at that time are turned on or gated to a high voltage to detect transmitted radiation, by the processor 40 or the computer 50.

When radiation scanning is conducted over at least a span of 180° plus the fan angle, a reconstruction solution that can produce images at least equivalent to the Feldkamp algorithm exists. The computer 50 may be configured to reconstruct CT images based on the data detected by the detector arrays 26 or 202 by rebinning or iterative techniques, such as Algebraic Reconstruction Techniques (ART) and Maximum Likelihood Expectation-Maximization (MLEM), for example, or an analytical solution similar to the Feldkamp algorithm. The reconstruction may be implemented by software, hardware, such as an application specific integrated circuit, or a combination of software and hardware.

An analytical solution similar to the Feldkamp algorithm may be developed for the configuration of a particular scanning unit. While in ideal cases the distance from each source 24 to the detector module of the detector arrays 26, 202 upon which that source aims its cone beam, is as close to a constant distance as possible, in the configurations described herein, each detector module is flat, and in certain configurations the radiation source 24 follows a rectangular path, not an arcuate path around the cargo container. The distance will not, therefore, be constant. A pre-processing algorithm may be used to compensate for the deviation in distance, and other aspects of the geometry and configuration of the system. The pre-processing algorithm may also correct for spaces between adjacent detector modules in the detector array 26, if there are any. These and other required corrections may be derived based on techniques known in the art for ideal cone beam reconstruction.

While the invention is particularly suited for scanning cargo containers for contraband, the invention may be readily adapted to scan other large objects, as well, such as trucks. Other sized objects, including smaller objects, could also be scanned by the scanning units described herein. Furthermore, while an X-ray radiation source is described in the examples above, the radiation source may provide other types of radiation, such as a neutron beam, for example.

One of ordinary skill in the art will recognize that other changes may be made to the embodiments described herein without departing from the scope of the invention, which is defined by the claims, below.

We claim:

1. A scanning system for examining contents of an object, the scanning system comprising:
a frame encompassing, at least in part, a first interior region;
at least one detector positioned and configured within the first interior region to encompass, at least in part, a second interior region within the first interior region, wherein an object to be examined is positionable within the second interior region;
a robotic arm movably supported by the frame;
a radiation source to generate a radiation beam to examine at least a portion of an object positioned within the second interior region, the radiation source being pivotally coupled to the robotic arm and movable by the robotic arm to examine the object from a plurality of positions at least partially around the object; and
a conveying system to move the object, at least in part, through the second interior region;
wherein:
radiation is detected by at least one of the at least one detectors after interaction with the object, from at least some of the plurality of positions; and
the robotic arm is configured to pivot the radiation source to aim the radiation source toward the object from at least some of the plurality of positions.

2. The scanning unit of claim 1, wherein the robotic arm is configured to move the radiation source only partially around an object to be examined.

3. The scanning system of claim 1, wherein the object comprises a cargo container.

4. The scanning system of claim 1, wherein:
the frame and the robotic arm are configured to move the radiation source in a region between the frame and the detector array.

5. The scanning system of claim 4, wherein:
the at least one detector comprises a detector array comprising a plurality of modules;
the system further comprising:
a second frame supporting the detector array;
wherein:
at least one detector module is movably supported by the second frame for movement between a first position and a second position with respect to the second frame.

6. The scanning system of claim 5, wherein:
in the first position, a respective one of the at least one detector modules is between the radiation source and the object; and
in the second position, the respective detector module is not between the radiation source and the object, such that at least a portion of the detector module is outside of the path of the radiation beam emitted by the radiation source, during scanning.

7. The scanning system of claim 5, wherein:
in the first position, a respective one of the detector modules is not in a position to detect radiation transmitted through the object; and
in the second position, the respective detector module is in position to detect radiation transmitted through the object.

8. The scanning system of claim 1, wherein:
the radiation source is movable within the second interior region, around the object.

9. The scanning system of claim 1, wherein the radiation source is a source of X-ray radiation.

10. The scanning system of claim 1, further comprising:
a processor configured to:
control operation of the robotic arm; and
reconstruct computed tomography images based, at least in part, on data received from the detector.

11. The scanning unit of claim 1, wherein the robotic arm is configured to pivot the radiation source about a horizontal axis.

12. The scanning unit of claim 11, wherein the robotic arm is configured to rotate the radiation source about a vertical axis.

13. The system of claim 11, wherein:
the conveying system is configured to move the object through the second interior region in a first direction; and
the frame is further configured to move the robotic arm in a second direction transverse to the first direction.

14. The scanning unit of claim 1, wherein the robotic arm is configured to rotate the radiation source about a vertical axis.

15. The scanning unit of claim 1, wherein the detector array is helical.

16. The scanning unit of claim 1, wherein:
the detector is aligned with a first plane; and
the robotic arm is offset from the first plane so that the radiation source is movable by the robotic arm in a second plane different from the first plane, the robotic arm being sufficiently offset from the first plane so that at least part of the radiation beam emitted by the radiation source illuminates the object without being intercepted by a portion of the detector.

17. A scanning system for examining contents of an object, the scanning system comprising:
- a frame encompassing, at least in part, a first interior region;
- a robotic arm supported by the frame within the first interior region;
- a radiation source to generate a radiation beam to examine an object, the radiation source being pivotally coupled to the robotic arm;
- a detector array within the first interior region and encompassing, at least in part, a second interior region, to detect radiation after interaction with the object;
- means for moving the object through the second interior region, in a first direction;
- means for moving the robotic arm in a second direction transverse to the first direction, partially around the object, to move the radiation source partially around the object; and
- means for moving a portion of the detector array between first and second positions as the radiation source is moved partially around the object.

18. A method of examining contents of an object, comprising:
- moving a radiation source partially around an object, by a robotic arm;
- generating a radiation beam to scan at least a portion of the object from a plurality of positions around the object;
- pivoting the radiation source as the radiation source is moved around the object, by the robotic arm, to aim the radiation source toward the object;
- detecting radiation transmitted through the object from a plurality of positions around the object by at least one detector positioned at least partially around the object; and
- processing data based on the detected radiation to form an image of at least the portion of the object.

19. The method of claim 18, comprising processing the data to form at least one computed tomographic image.

20. The method of claim 18, wherein the at least one detector comprises a detector array, the method comprising:
- detecting the radiation by the detector array; and
- moving at least a portion of the detector array between a first position between the object and the radiation source and a second position not between the object and the radiation source.

21. The method of claim 18, wherein the at least one detector comprises a detector array, the method further comprising:
- detecting the radiation by the detector array; and
- moving at least a portion of the detector array into a position to detect the radiation, based, at least in part, on a position of the radiation source.

22. The method of claim 21, comprising:
- moving the radiation source diagonally with respect to the object.

23. The method of claim 18, wherein the detector array is aligned with a first plane, the method comprising:
- moving the radiation source through a plane offset from the central plane.

24. The method of claim 18, comprising:
- detecting the radiation by a helical detector.

25. The method of claim 18, wherein the object comprises a cargo container, the method further comprising:
- moving the cargo container in a first direction, through a region defined, at least in part, by a detector array; and
- moving the radiation source around the cargo container by the robotic arm in a second direction transverse to the first direction.

* * * * *